US012800381B2

(12) United States Patent
Cote

(10) Patent No.: US 12,800,381 B2
(45) Date of Patent: Nov. 17, 2026

(54) FLUID DISPENSER VOLUME CALIBRATION DEVICE

(71) Applicant: Mettler-Toledo Rainin, LLC, Oakland, CA (US)

(72) Inventor: Richard Cote, Hudson, MA (US)

(73) Assignee: Mettler-Toledo Rainin, LLC, Oakland, CA (US)

( * ) Notice: Subject to any disclaimer, the term of this patent is extended or adjusted under 35 U.S.C. 154(b) by 303 days.

(21) Appl. No.: 18/198,438

(22) Filed: May 17, 2023

(65) Prior Publication Data

US 2023/0375394 A1 Nov. 23, 2023

Related U.S. Application Data

(60) Provisional application No. 63/342,889, filed on May 17, 2022.

(51) Int. Cl.
*G01F 25/00* (2022.01)

(52) U.S. Cl.
CPC ................................ *G01F 25/0092* (2013.01)

(58) Field of Classification Search
None
See application file for complete search history.

(56) References Cited

U.S. PATENT DOCUMENTS 5,895,838 A 4/1999 Harjunmaa et al.
8,091,405 B2 1/2012 Schmid et al.
9,517,464 B2 12/2016 Glasgow et al.
10,550,833 B2 * 2/2020 Richter ............... F16K 99/0001
11,131,341 B1 * 9/2021 Lin ..................... F16C 32/0655
2004/0018523 A1 * 1/2004 Hawkins ............... B01L 3/5027 435/6.12
2005/0148091 A1 * 7/2005 Kitaguchi ......... B01L 3/502738 422/562
2007/0092975 A1 * 4/2007 Potyrailo ............... G01N 21/78 436/169
2010/0286932 A1 * 11/2010 Caldwell ................. G01F 22/02 702/55
2011/0056287 A1 3/2011 Schardt et al.
2016/0231163 A1 * 8/2016 Van 't Oever ...... G01F 25/0092
2020/0023357 A1 * 1/2020 Glasgow ............. G01F 25/0092
2022/0155328 A1 * 5/2022 Sliz .................. G01N 35/00584

FOREIGN PATENT DOCUMENTS

DE 102017123249 4/2019
EP 3608640 A1 2/2020
EP 3951199 A1 2/2022
JP 2006-177850 A 7/2006
WO 2019068724 A1 4/2019

* cited by examiner

*Primary Examiner* — Mark A Shabman

(74) *Attorney, Agent, or Firm* — Standley Law Group LLP; Jeffrey S. Standley; Adam J. Smith

(57) ABSTRACT

The technology relates in part to a device and associated methodology useful for accurately and precisely measuring fluid volume dispensed from a fluid dispenser device, and in certain applications, volume dispensed from a multichannel fluid dispenser device.

18 Claims, 25 Drawing Sheets

FLUID DISPENSER VOLUME CALIBRATION DEVICE

RELATED APPLICATIONS

This U.S. Utility patent application claims the benefit of priority under 35 U.S.C. § 119(e) of U.S. Provisional Patent Application Ser. No. 63/342,889 filed on May 17, 2022. The aforementioned application is expressly incorporated herein by reference in its entirety and for all purposes. All publications, patents, patent applications cited herein are hereby expressly incorporated by reference for all purposes.

TECHNICAL FIELD

The technology relates in part to a device and associated methodology useful for accurately and precisely measuring fluid volume dispensed from a fluid dispenser device, and in certain applications, volume dispensed from a multichannel fluid dispenser device. Such volume measurements are useful for calibrating a fluid dispensing device.

BACKGROUND

Fluid dispensers are commonly utilized in laboratory settings. A fluid dispenser sometimes is a single-channel device that delivers a liquid volume to one target location in one operation, and sometimes is a multi-channel device that delivers a liquid volume to each of multiple target locations in one operation.

SUMMARY

Operators often depend on fluid dispenser devices delivering a fluid volume with precision and accuracy. In alternative embodiments, volume calibration devices and methodologies provided herein can assess dispensed volume precision and accuracy via low-error volume measurements. Without being limited by theory, in alternative embodiments, low-error volume measurements are afforded by efficient transfer of sample fluid delivered through a fluid path of the device, and by other features.

Provided in certain aspects is a fluid dispenser volume calibration device, which includes: an anterior surface, a posterior surface, a side surface, a first chamber, a second chamber hydrophobic membrane and a channel, where: the first chamber comprises an anterior opening disposed at the anterior surface of the device and a posterior terminus; the second chamber comprises a posterior terminus, a sidewall and an anterior terminus; the hydrophobic membrane is in fluid connection with the second chamber; and the channel comprises a proximal terminus in fluid connection with the first chamber and a distal terminus in fluid connection with the second chamber Provided in certain aspects is a method for manufacturing a device described herein, which includes: providing a posterior section and an anterior section; and bonding the posterior section to the anterior section. In certain implementations, the anterior section includes the first chamber, the posterior section includes the second chamber and the hydrophobic membrane. In certain instances, the posterior section includes at least a portion of the channel. Provided in certain aspects is a method for manufacturing a device described herein, which includes: providing a substrate, an anterior member and a posterior member; and bonding the posterior member anterior surface to at least a portion of the substrate posterior surface and bonding the anterior member posterior surface to at least a portion of the substrate anterior surface Provided in certain aspects is a method for determining the volume of fluid dispensed by a fluid dispenser device, which includes: dispensing fluid from a fluid dispensing device into a first chamber of a volume calibration device containing no fluid, whereby the first chamber of the calibration device includes a dispensed fluid from the fluid dispenser device; determining the location of a fluid endpoint in the channel; and determining the volume of the dispensed fluid in the calibration device based on the location of the fluid endpoint. The dispensed fluid can flow from the first chamber into a channel including a proximal terminus in association with the first chamber. The dispensed fluid can flow in the channel into a second chamber in association with a distal terminus of the channel. The dispensed fluid can flow in the channel under a pressure differential between the first chamber and the second chamber. The dispensed fluid can fill the second chamber and can fill a portion of the channel to a fluid endpoint between the channel proximal terminus and the channel distal terminus in a continuous fluid path between the second chamber and the fluid endpoint.

Certain implementations are described further in the following description, claims and drawings.

DESCRIPTION OF DRAWINGS

The drawings illustrate certain implementations of the technology and are not limiting. For clarity and ease of illustration, the drawings are not made to scale and, in some instances, various aspects may be shown exaggerated or enlarged to facilitate an understanding of particular implementations.

FIG. 6 to FIG. 8D illustrate calibration device 100 in use to determine dispensed fluid volume. FIG. 6 is a top perspective view of device 100 in association with pipette tip 200 containing fluid 290. FIG. 7 illustrates fluid 290 dispensed from pipette tip 200 into volume calibration device 300. Device 300 has the same features as device 100 except that device 300 contains dispensed fluid 290 and device 100 contains no dispensed fluid. FIG. 8D is a top view of the posterior section 338 depicted in FIG. 8C.

Figure 1:
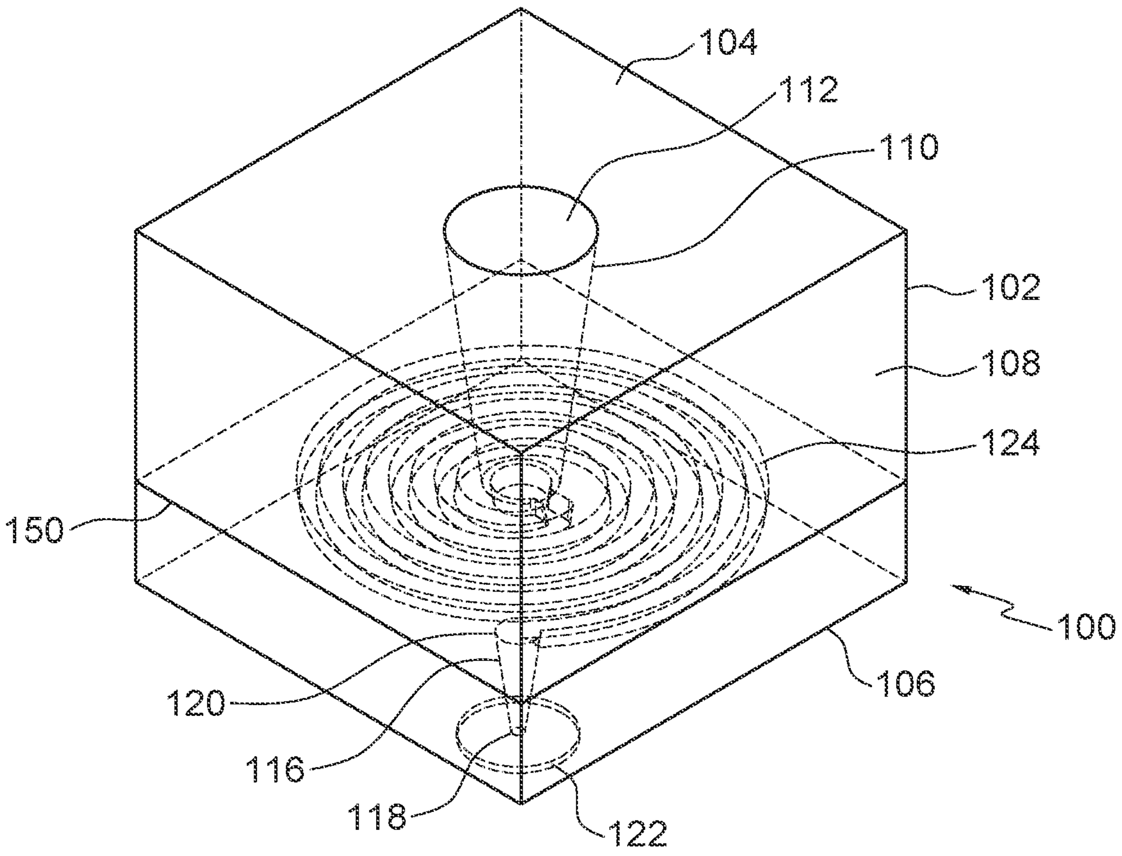
FIG. 1 is a top perspective view of a volume calibration device 100. Each of FIG. 2A
Figure 2A:
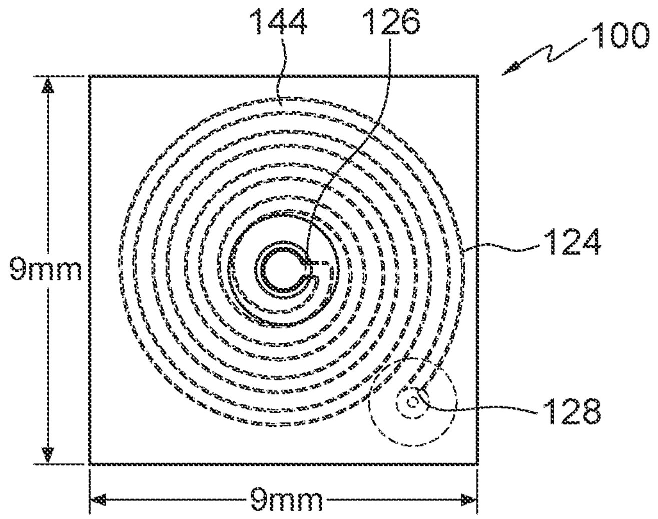
FIG. 2B is a top view of device 100, each of FIG. 3A

The following table describes exemplary elements of devices illustrated in the drawings.

| Callout | Element |
|---|---|
| 100 | volume calibration device containing no fluid |
| 102 | substrate |
| 104 | substrate anterior surface |
| 106 | substrate posterior surface |
| 108 | substrate side surface |
| 110 | first chamber (also referred to as “sample port”) |
| 112 | first chamber anterior opening |
| 114 | first chamber posterior terminus |
| 116 | second chamber (also referred to as “vacuum port”) |
| 118 | second chamber posterior opening (also referred to as “vacuum port opening”) |
| 120 | second chamber anterior terminus |
| 122 | hydrophobic membrane (also referred to as “porous membrane”) |
| 124 | channel (also referred to as “sample channel”) |
| 126 | channel proximal terminus |
| 128 | channel distal terminus |
| 130 | well |
| 132 | well side |
| 134 | well anterior opening |
| 136 | anterior section |
| 138 | posterior section |
| 140 | anterior section posterior surface (also referred to as “bonded surface”) |
| 142 | posterior section anterior surface (also referred to as “bonded surface”) |
| 144 | channel anterior surface |
| 146 | channel posterior surface |
| 148 | channel side |
| 150 | junction between anterior section and posterior section (also referred to as “bond layer”) |
| 190 | virtual central point |
| 200 | pipette tip connected to fluid dispenser device |
| 202 | pipette tip distal portion |

-continued

| Callout | Element |
|---|---|
| 290 | fluid in dispenser |
| 292 | fluid endpoint in channel |
| 294 | fluid in second chamber |
| 296 | continuous fluid path |
| 300 | volume calibration device (identical to device 100 but including dispensed fluid 290) |
| 302 | substrate |
| 304 | substrate anterior surface |
| 306 | substrate posterior surface |
| 308 | substrate side surface |
| 310 | first chamber (also referred to as “sample port”) |
| 312 | first chamber anterior opening |
| 314 | first chamber posterior terminus |
| 316 | second chamber (also referred to as “vacuum port”) |
| 318 | second chamber posterior opening (also referred to as “vacuum port opening”) |
| 320 | second chamber anterior terminus |
| 322 | hydrophobic membrane (also referred to as “porous membrane”) |
| 324 | channel (also referred to as “sample channel”) |
| 325 | portion of channel filled with continuous fluid path |
| 326 | channel proximal terminus |
| 327 | portion of channel not filled with fluid |
| 328 | channel distal terminus |
| 330 | well |
| 332 | well side |
| 334 | well anterior opening |
| 336 | anterior section |
| 338 | posterior section |
| 340 | anterior section posterior surface (also referred to as “bonded surface”) |
| 342 | posterior section anterior surface (also referred to as “bonded surface”) |
| 344 | channel anterior surface |
| 346 | channel posterior surface |
| 348 | channel side |
| 350 | junction between anterior section and posterior section (also referred to as “bond layer”) |
| 390 | virtual central point |
| 400 | volume calibration device containing multiple calibration units |
| 402 | substrate |
| 404 | substrate anterior surface |
| 406 | substrate posterior surface |
| 408 | substrate side surface |
| 410 | first chamber (also referred to as “sample port”) |
| 412 | first chamber anterior opening |
| 414 | first chamber posterior terminus |
| 416 | second chamber (also referred to as “vacuum port”) |
| 418 | second chamber posterior opening (also referred to as “vacuum port opening”) |
| 420 | second chamber anterior terminus |
| 422 | hydrophobic membrane (also referred to as “porous membrane”) |
| 424 | channel (also referred to as “sample channel”) |
| 426 | channel proximal terminus |
| 428 | channel distal terminus |
| 430 | well |
| 432 | well side |
| 434 | well anterior opening |
| 436 | anterior section |
| 438 | posterior section |
| 440 | anterior section posterior surface (also referred to as “bonded surface”) |
| 442 | posterior section anterior surface (also referred to as “bonded surface”) |
| 444 | channel anterior surface |
| 446 | channel posterior surface |
| 448 | channel side |
| 450 | junction between anterior section and posterior section (also referred to as “bond layer”) |
| 460 | calibration unit |
| 490 | virtual central point |
| 500 | volume calibration device containing no fluid |
| 501 | calibration unit |
| 502 | substrate |
| 503 | substrate first chamber bore |

-continued

| Callout | Element |
|---|---|
| 504 | substrate anterior surface |
| 505 | substrate first chamber bore opening |
| 506 | substrate posterior surface |
| 508 | substrate exterior wall exterior surface |
| 509 | substrate exterior wall exterior surface |
| 510 | first chamber (also referred to as "sample port") |
| 511 | first chamber posterior opening or port |
| 512 | first chamber anterior opening |
| 513 | first chamber posterior surface (also referred to as a "floor") |
| 514 | first chamber posterior terminus |
| 515 | first chamber sidewall |
| 516 | second chamber |
| 517 | substrate second chamber bore |
| 518 | second chamber posterior terminus |
| 519 | second chamber bore posterior opening |
| 520 | second chamber anterior terminus |
| 520' | second chamber anterior opening or port |
| 521 | second chamber anterior surface (also referred to as a "ceiling") |
| 522 | hydrophobic membrane (also referred to as "porous membrane") |
| 523 | second chamber sidewall |
| 524 | channel (also referred to as "sample channel") |
| 525 | channel lateral member |
| 526 | channel proximal terminus |
| 527 | channel transition member |
| 528 | channel distal terminus |
| 529 | channel interior wall |
| 530 | well |
| 531 | second chamber posterior opening or port |
| 532 | well sidewall |
| 533 | well posterior terminus |
| 533' | well posterior port |
| 534 | well anterior terminus |
| 535 | axial duct |
| 536 | axial duct sidewall |
| 536' | axial duct anterior opening or port |
| 537 | axial duct anterior terminus |
| 538 | axial duct posterior terminus |
| 538' | axial duct bore posterior terminus in substrate posterior surface 506 |
| 539 | substrate posterior surface adjacent to posterior member posterior bore and axial duct posterior opening |
| 540 | anterior member |
| 542 | anterior member posterior surface (also referred to as "bonded surface") |
| 544 | anterior member anterior surface |
| 545 | anterior member bore |
| 546 | lateral duct |
| 547 | lateral duct sidewall |
| 548 | lateral duct proximal terminus |
| 549 | lateral duct distal terminus |
| 550 | posterior member |
| 552 | posterior member anterior surface (also referred to as "bonded surface") |
| 554 | posterior member posterior surface |
| 556 | posterior member bore |
| 560 | channel anterior surface |
| 562 | channel posterior surface |
| 564 | channel sidewall |
| 570 | junction between vent anterior opening and lateral duct proximal opening (also referred to as a "recess") |
| 571 | sidewall of junction 570 |
| 572 | opening or port in sidewall 571 of junction 570 |
| 573 | relieved surface of junction 570 in substrate |
| 574 | relieved surface opening or port |
| 575 | vent |
| 576 | vent anterior terminus |
| 577 | vent posterior terminus |
| 578 | vent interior sidewall |
| 580 | junction between anterior member and substrate (also referred to as "bond layer") |
| 582 | junction between posterior member and substrate (also referred to as "bond layer") |
| 584 | substrate interior wall surface |

-continued

| Callout | Element |
|---|---|
| 585 | substrate interior wall surface |
| 586 | substrate inset surface between exterior wall interior surface and interior wall surface |
| 587 | substrate exterior wall interior surface |
| 588 | substrate exterior wall interior surface |
| 591 | offset distance between substrate interior surface 584 and posterior member bore |
| 592 | offset distance between substrate interior surface 585 and posterior member bore |
| 593 | offset distance between exterior surface 508 and anterior member bore |
| 594 | offset distance between substrate exterior surface 509 and anterior member bore |
| 598 | posterior-to-anterior direction |
| 599 | anterior-to-posterior direction |
| 600 | vacuum manifold assembly |
| 650 | vacuum manifold |
| 652 | vacuum manifold anterior surface |
| 660 | vacuum manifold relieved surface |
| 662 | vacuum manifold interior side surface |
| 670 | vacuum manifold interior cavity |
| 682 | vacuum connector |
| 684 | vacuum connector orifice |
| 686 | pressure gauge |
| 688 | vacuum connector linkage |

Like reference symbols in the various drawings indicate like elements.

DETAILED DESCRIPTION

In alternative embodiments, a problem solved by devices and methodology provided herein is assessing liquid transfer performance from a liquid dispensing device. Devices and methodology provided herein in particular solve a problem of assessing liquid transfer performance across multiple channels of a multichannel fluid dispenser, often for a single multichannel dispensing event.

Devices and methodology provided herein can assess accuracy of dispensed fluid volumes (i.e., how close a dispensed volume is to a set volume of a liquid dispenser) and precision of dispensed fluid volumes (i.e., how repeatable is a dispensed volume for a set volume of a liquid dispenser). These parameters can be assessed for multiple transfers from a single pipetting channel, or single or multiple transfers from a collection of channels of a multichannel liquid dispenser. Accuracy typically is reported as a percent error of a mean transferred volume relative to a set volume. Precision typically is reported as a coefficient of variation (CV) calculated by determining a standard deviation of a number of dispensed volumes (across a single channel, or multiple channels) and dividing the standard deviation by a mean dispensed volume, where a CV value often is reported as a percent. A user can assess performance within a channel using data from multiple dispensed volumes from that channel, and/or across multiple channels of a multi-channel liquid handler for a single dispensed volume or for two or more different dispensed volumes.

Devices and methodology useful for efficiently assessing precision and accuracy of dispensed volumes with low error are provided herein. Devices and methodology provided herein can facilitate low-error measurements by efficient transfer of sample fluid delivered through a fluid path of the device, and by other features.

The devices and methodology provided herein are useful for calibrating a fluid dispenser device. A dispensing device not meeting precision and/or accuracy requirements for dispensed volumes can be adjusted and reassessed to determine whether the adjusted dispenser meets the required fluid dispensing requirements as part of a calibration process, for example. Accordingly, devices described herein are referred to as "calibration devices" as they are useful for conducting calibration assessments.

Volume Calibration Device

In certain implementations, provided is a fluid dispenser volume calibration device that includes: a substrate containing an anterior surface, a posterior surface and a side surface; a first chamber disposed in the substrate, the first chamber containing an anterior opening disposed at the anterior surface of the substrate and a posterior terminus (often within the substrate); a second chamber disposed in the substrate, the second chamber containing a posterior opening disposed at the posterior surface of the substrate and an anterior terminus (often within the substrate); a hydrophobic membrane disposed at the posterior surface of the substrate at the opening of the second chamber; and a channel disposed in the substrate. A channel generally includes a proximal terminus in fluid connection with the first chamber (for example, in fluid connection with the posterior terminus of the first chamber) and a distal terminus in fluid connection with the second chamber (for example, in fluid connection with the anterior terminus of the second chamber; in fluid connection with the posterior terminus of the second chamber). A channel proximal terminus may be joined to a side of a first chamber. A channel proximal terminus sometimes is joined to a side of a well, where the well includes an anterior opening disposed at a posterior position of the first chamber. A channel proximal terminus sometimes is joined to a well side and at the anterior terminus of the well. A well sometimes is concentrically disposed, relative to the anterior terminus of the first chamber. A well sometimes is integrated with the first chamber, and an anterior terminus of a well may be joined to a posterior terminus of a first chamber. A channel distal terminus sometimes is joined to a side of the second chamber, sometimes is joined at a side and at the anterior terminus of the second chamber, and/or sometimes is joined at a side and at the posterior terminus of the second chamber.

A hydrophobic membrane sometimes is disposed externally on a posterior surface of the device. A hydrophobic membrane sometimes is disposed on an anterior surface of a substrate of a device, and may be covered by another member of a device (for example, an anterior member). A hydrophobic membrane and an opening of a second chamber typically are not disposed at an exterior anterior surface or an exterior side surface of a device. The anterior terminus of a second chamber sometimes is internally disposed within the device and sometimes is not disposed at an exterior anterior surface of the device. A hydrophobic membrane typically is not disposed at a channel distal terminus. A hydrophobic membrane sometimes is disposed at a posterior terminus of a second chamber or sometimes is disposed at an anterior terminus of a second chamber. The posterior terminus of a second chamber sometimes is coextensive with a posterior opening of the second chamber at a location on a posterior surface of the device. In certain instances, a posterior surface of the device includes a recess that includes a recessed surface, a posterior opening of a second chamber is disposed at the recessed surface. A hydrophobic membrane can be disposed on a posterior surface of a device surrounding a recess, or can be disposed within the recess. A hydrophobic membrane sometimes is disposed adjacent to or at a terminus of the second chamber (for example, second chamber posterior terminus and/or second chamber posterior terminus opening). The anterior terminus of a second chamber sometimes is coextensive with an anterior opening of the second chamber disposed at an anterior location of a substrate and/or at a posterior surface of an anterior member. In certain instances, an anterior surface of a substrate includes a recess that includes a recessed surface, and an anterior opening of a second chamber sometimes is disposed at or adjacent to the recessed surface. A hydrophobic membrane can be disposed in the recess, and a surface of the hydrophobic membrane (for example, a posterior surface of the hydrophobic membrane) sometimes is joined to the recessed surface within the recess.

In certain implementations, a device includes an optional vent joined to a second chamber terminus and/or second chamber opening, and a hydrophobic membrane is disposed at a vent terminus. For example, a substrate of a device can include an optional vent disposed between a second chamber terminus (for example, a second chamber anterior terminus) and an anterior surface of the substrate. An anterior terminus of an optional vent can be disposed at an anterior surface of a substrate, or an anterior terminus of an optional vent sometimes is disposed at a recessed surface of a recess, the recess being disposed at an anterior surface of a substrate. A proximal terminus of an optional vent sometimes is disposed at an anterior terminus and/or anterior opening of a second chamber. An optional vent often is a void within a device, sometimes in a substrate, and is of any suitable shape for transmitting fluid, such as a cylinder or frustrum (for example, a conical frustrum). A surface of a hydrophobic membrane (for example, a proximal surface of a hydrophobic membrane) sometimes is disposed at an anterior terminus of an optional vent (for example, a hydrophobic membrane may be disposed in a recess within a substrate).

A channel generally includes a length and a cross-sectional width and often includes at least a portion that is significantly longer than it is wide. In at least a portion of a channel (for example, at an expected location of a dispensed fluid endpoint (described herein)), the length of a channel typically is a major dimension and the width of a channel typically is a minor dimension. In at least a portion of a channel (for example, at an expected location of a dispensed fluid endpoint), the length of a channel often is significantly larger than the width as a longer channel can afford accurate determinations of a dispensed volume. Without being limited by theory, a relatively small difference in dispensed volume can result in a larger difference in location of a dispensed fluid endpoint in a longer channel. A channel or portion thereof sometimes is a microfluidic channel, and sometimes a channel or portion thereof is a capillary or is not a capillary.

A channel can be disposed in a substrate in any configuration suitable for identification of a fluid endpoint within a channel and suitable for effecting a continuous fluid slug of dispensed fluid in a calibration device (for example, minimizing or preventing bubbles (for example, air bubbles) in in the dispensed fluid). A channel often is disposed in a configuration for which a volume or surface area that contains the channel is minimized, which is particularly applicable for devices containing an array of calibration units (described herein). In certain implementations, a single calibration unit 501 contains a single first chamber, a single axial duct, a single connected junction 570 and a single connected single axial duct 535 shown in the bottom right corner of FIG. 11B, and shown at the bottom right of FIG. 16D, and includes a single second chamber 516 and a single attached channel 524 shown in the middle of FIG. 12B, middle of FIG. 13D and middle of FIG. 13E, and the bottom right of FIG. 16E.

A channel sometimes is spirally disposed in a substrate, where the channel is wound in a continuous and gradually widening curve from the proximal terminus to the distal terminus around a virtual center point. Sometimes the virtual center point of a spirally disposed channel is concentric with a virtual center point of the first chamber (for example, a center point of the first chamber posterior terminus) and/or a virtual center point of a well (described herein) disposed in an anterior position relative to the first chamber posterior terminus to which the proximal terminus of the channel is joined. A spirally-disposed channel sometimes is wound around a virtual central point on a virtual flat plane coinciding with a surface of the channel, which can be considered a two-dimensional channel orientation. A channel typically includes an anterior surface and sometimes a spirally-disposed channel is wound around a virtual central point on a virtual flat plane coinciding with the anterior surface of the channel. In certain instances, a spirally-disposed channel is wound around a virtual axis perpendicular to the anterior surface on a virtual frustrum or virtual cone coinciding with a surface of the channel (for example, an anterior surface of the channel), which can be considered a non-planar, three-dimensional orientation.

A channel can be configured in a non-spiral configuration, such as a configuration that includes linear spans or substantially linear spans (also referred to herein as a "linear member" or "substantially linear member," as a "span" and as a "lateral member") each joined by a transition member. At least a portion of a transition member sometimes is curved and sometime is defined by a radius (for example, also referred to herein as a "curved portion"). Lateral members sometimes are arranged in a switchback orientation. Lateral members can be disposed in a virtual plane (two-dimensional orientation). Lateral members can be disposed in a non-planar, three dimensional orientation (for example, one or more lateral members disposed at an angle in the posterior-to-anterior direction with respect another lateral member). Some or all lateral members sometimes are parallel or substantially parallel to one another in a calibration unit. A calibration unit channel may include any suitable number of lateral members, and sometimes includes 2, 3, 4, 5, 6, 7, 8, 9 or 10 or more lateral members. Lateral members in a channel of a calibration unit sometimes are the same length or of one or more different lengths. A calibration unit channel may include a transition member between each lateral member, may include a transition member to the second chamber at the channel distal terminus, and may include a transition member from a first chamber or well at the channel proximal terminus.

In certain implementations, a channel includes a major length and a cross section perpendicular to the major length. A cross section and orientation of a channel in a substrate can be selected to maintain a continuous fluid slug for dispensed fluid (for example, minimize or prevent bubbles (for example, air bubbles) from forming in dispensed fluid) that has flowed within the device. In certain instances, the cross-section geometry and the cross-section surface area of a channel each independently is substantially uniform or non-uniform across the length of the channel. In certain implementations, a cross-section surface area of a channel is not uniform across the length of the channel. A channel may include a first region of larger cross-section surface area (for example, a pocket) adjacent to a second region of smaller cross-section area (for example, a detection region), where a dispensed fluid endpoint is identified in the second region, in certain implementations. For example, in an instance of an expected dispensed fluid volume of 50 microliters, a portion of a channel can include a pocket that holds 48 microliters, the pocket transitioning to an adjacent, distally-disposed detection region that can hold 4 microliters, which permits precise measurement of a dispensed volume in the range of 48 microliters to 52 microliters in the detection region while holding the bulk of the sample in the pocket region. In certain instances, the cross-section geometry of a channel is quadrilateral (for example, rectangle, square) or ovoid (for example, oval, circular) and/or can have tapered sides and/or curved sides (for example, U-shaped, V-shaped). A channel cross section can have a width (i.e., perpendicular to the anterior to posterior direction), and a depth (i.e., parallel to the anterior to posterior direction) the same or different than the width, independently about 0.2 millimeters to about 1 millimeter (for example, about 0.3, 0.4, 0.5, 0.6, 0.7, 0.8 or 0.9 millimeters).

A first chamber is of a suitable shape that facilitates transmission of a fluid into the channel, and may be or include a cylinder, cylindroid, cube or cuboid in certain implementations. A first chamber often includes an interior sidewall that facilitates dispensation of a fluid into the calibration device. An interior sidewall of a first chamber often is smooth or substantially smooth and sometimes includes a hydrophobic surface. In certain implementations, a first chamber includes or is a frustrum (for example, a right frustrum, a truncated cone, a truncated pyramid). In certain instances, the first chamber is or includes a frustrum (for example, a truncated cone) and includes an interior sidewall that tapers in the anterior-to-posterior direction. A first chamber sometimes is a triangular prism or triangular prismoid (also referred to as a triangular first chamber), with a triangular portion sometimes disposed at or near the anterior terminus and/or posterior terminus of the first chamber. A triangular first chamber sometimes includes a posterior surface (also referred to as a floor), which sometimes is sloped in an anterior-to-posterior direction towards the posterior terminus of the first chamber. One or more sides of a triangular first chamber sometimes taper in an anterior-to-posterior direction.

A first chamber often is a void in a device and sometimes is defined by one or more bores. The anterior opening of a first chamber often is disposed at an anterior surface of a device. An anterior opening of a first chamber sometimes is disposed at an anterior surface of an anterior section of a device, and sometimes a first chamber is defined by a bore in the anterior section (for example, device 100 illustrated in FIG. 5A). An anterior opening of a first chamber sometimes is disposed at an anterior surface of an anterior member of a device, and sometimes a first chamber is defined in part by a bore in the anterior member and a coextensive bore in a joined substrate of the device (for example, device 500 illustrated in FIG. 13C).

A first chamber often includes a posterior opening disposed at the first chamber posterior terminus. A posterior opening disposed at the posterior terminus of the first chamber often is substantially smaller than the anterior opening of the first chamber. An optional well sometimes is disposed at the first chamber posterior terminus. A well sometimes is disposed in a posterior orientation with respect to the first chamber posterior terminus, where an anterior terminus of the well sometimes is disposed at the first chamber posterior terminus opening. A well can include a side and a posterior terminus, and a channel proximal terminus can be disposed at the well side and/or at the well posterior terminus. A well often is a void, sometimes in a substrate and/or posterior section of a device, sometimes is or includes a cylinder, cylindroid, cube or cuboid and sometimes is or includes a frustrum (for example, a right frustrum, a truncated cone, a truncated pyramid), optionally with one or more sides tapering in the anterior-to-posterior direction. A channel proximal terminus may be directly disposed at a first chamber posterior opening, the first chamber opening can be disposed at the first chamber posterior terminus and/or side, and a device may not include a well adjacent to the first chamber.

A second chamber is of a suitable shape that facilitates transmission of fluid from the channel, and may be cylinder, cylindroid, cube or cuboid in certain implementations, and may include or be a frustrum (for example, a right frustrum, a truncated cone, a truncated pyramid) in certain implementations. A second chamber includes a sidewall that often is smooth or substantially smooth and permits flow of fluid. In certain instances, the second chamber is a frustrum (for example, truncated cone) and includes an interior sidewall that tapers in the posterior-to-anterior direction (for example, second chamber in device 100 illustrated in FIG. 3A). A second chamber sometimes is a triangular prism or triangular prismoid (also referred to as a triangular second chamber), with a triangular portion sometimes disposed at or near the anterior terminus and/or posterior terminus of the second chamber (for example, second chamber illustrated in FIG. 14A and FIG. 13C). A second chamber (for example, a triangular second chamber) sometimes includes an anterior surface (also referred to as a ceiling), which sometimes is sloped in a posterior-to-anterior direction towards the anterior terminus of the second chamber (for example, second chamber illustrated in FIG. 13C). One or more sides of a second chamber (for example, a triangular second chamber) sometimes taper in a posterior-to-anterior direction (for example, second chamber of device 500 illustrated in FIG. 13C).

A second chamber often is a void in a device and sometimes is defined by one or more bores. A second chamber bore sometimes is disposed in a posterior section of a device and includes an opening at the anterior surface and the posterior surface of the posterior section (for example, device 100 illustrated in FIG. 3A and FIG. 5). A second chamber bore sometimes is disposed in a substrate of a device, sometimes includes a bore opening at a posterior surface of the substrate, and sometimes terminates within the substrate at a distance from the anterior substrate surface (for example, device 500 illustrated in FIG. 13C). A second chamber bore disposed in a substrate of a device can include a bore opening at a posterior surface of the substrate, and can include an opposing opening at or near an anterior substrate surface or at a posterior vent opening.

Figure 3A:
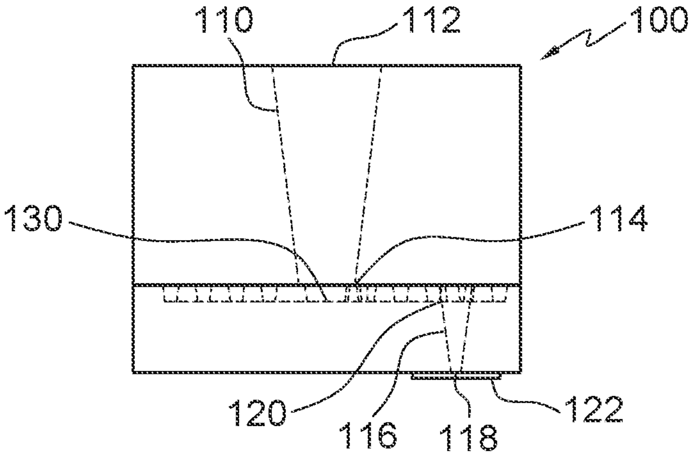
FIG. 3B is a side view thereof, and each of FIG. 4A
Figure 4A:
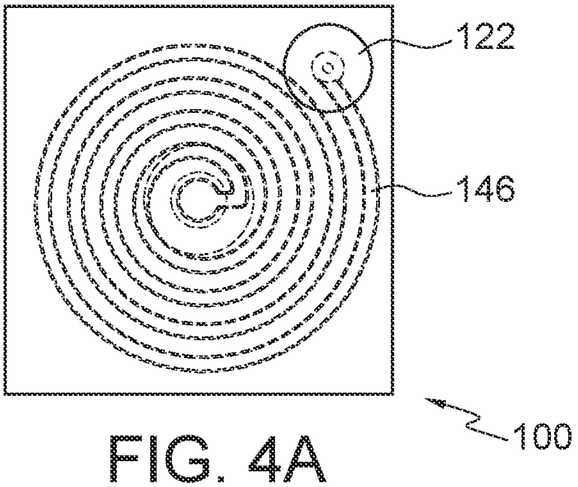
FIG. 4B is a bottom view thereof.
Figure 2B:
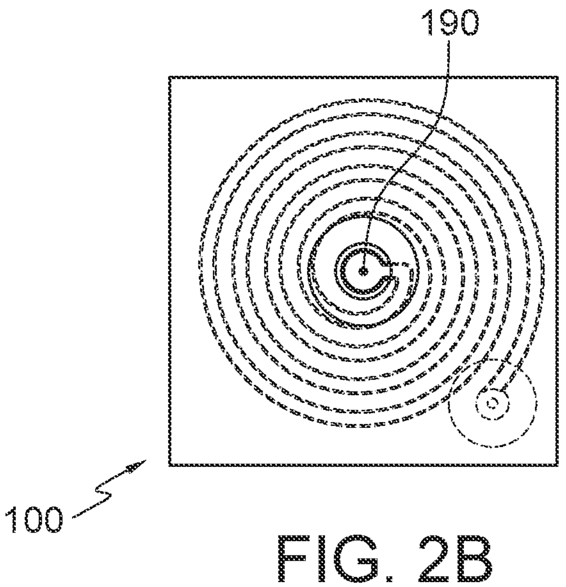

A posterior opening of a second chamber sometimes is disposed at a posterior surface of a device, and sometimes is not disposed at a side of the second chamber (for example, device 100 illustrated in FIG. 3A). A posterior opening of a second chamber sometimes is disposed at a posterior surface of a posterior section of a device, and sometimes a second chamber is defined by a bore in the posterior section (for example, device 100 illustrated in FIG. 5A). A posterior opening of a second chamber sometimes is disposed at a posterior surface of a substrate of a device, and sometimes a posterior terminus of a second chamber is defined in part by a bore in the substrate having an opening at the substrate posterior surface and a solid coextensive portion of a joined posterior member of the device (for example, device 500 illustrated in FIG. 13C).

A second chamber can include an opening disposed at or adjacent to the second chamber anterior terminus. In certain implementations, an opening is disposed at a side of the second chamber and at the second chamber posterior terminus, and is disposed at the channel distal terminus (for example, device 100 illustrated in FIG. 5A). In certain implementations, an opening is disposed at the second chamber anterior terminus, sometimes is not disposed at the side of the second chamber, and sometimes is in fluid association with a hydrophobic membrane (for example, device 500 illustrated in FIG. 13E). A surface of a hydrophobic membrane (for example, a hydrophobic membrane posterior surface) sometimes is disposed at a relieved surface in a junction in the device. A second chamber anterior terminus opening can be directly disposed at the relieved surface of the junction. In certain implementations, a second chamber anterior terminus opening is disposed at a vent, which sometimes is disposed in an anterior orientation with respect to the second chamber anterior terminus (for example, device 500 illustrated in FIG. 13C). A second chamber anterior terminus opening sometimes is disposed at a vent posterior terminus, and the vent anterior terminus sometimes is disposed at the relieved surface of the junction or an anterior surface of a device or substrate. A vent often is a void, sometimes in a substrate, sometimes is or includes a cylinder, cylindroid, cube or cuboid and sometimes is or includes a frustrum (for example, a right frustrum, a truncated cone, a truncated pyramid), optionally with one or more sides that taper in the posterior-to-anterior direction.

A second chamber often includes an opening disposed at and/or adjacent to the second chamber posterior terminus. A second chamber posterior terminus opening sometimes is disposed at a posterior surface of the device and sometimes is disposed at a posterior surface of a second section of the device (for example, device 100 illustrated in FIG. 3A). A second chamber posterior terminus opening sometimes is disposed at a hydrophobic membrane (for example, device 100 illustrated in FIG. 3A).

Figure 12A:
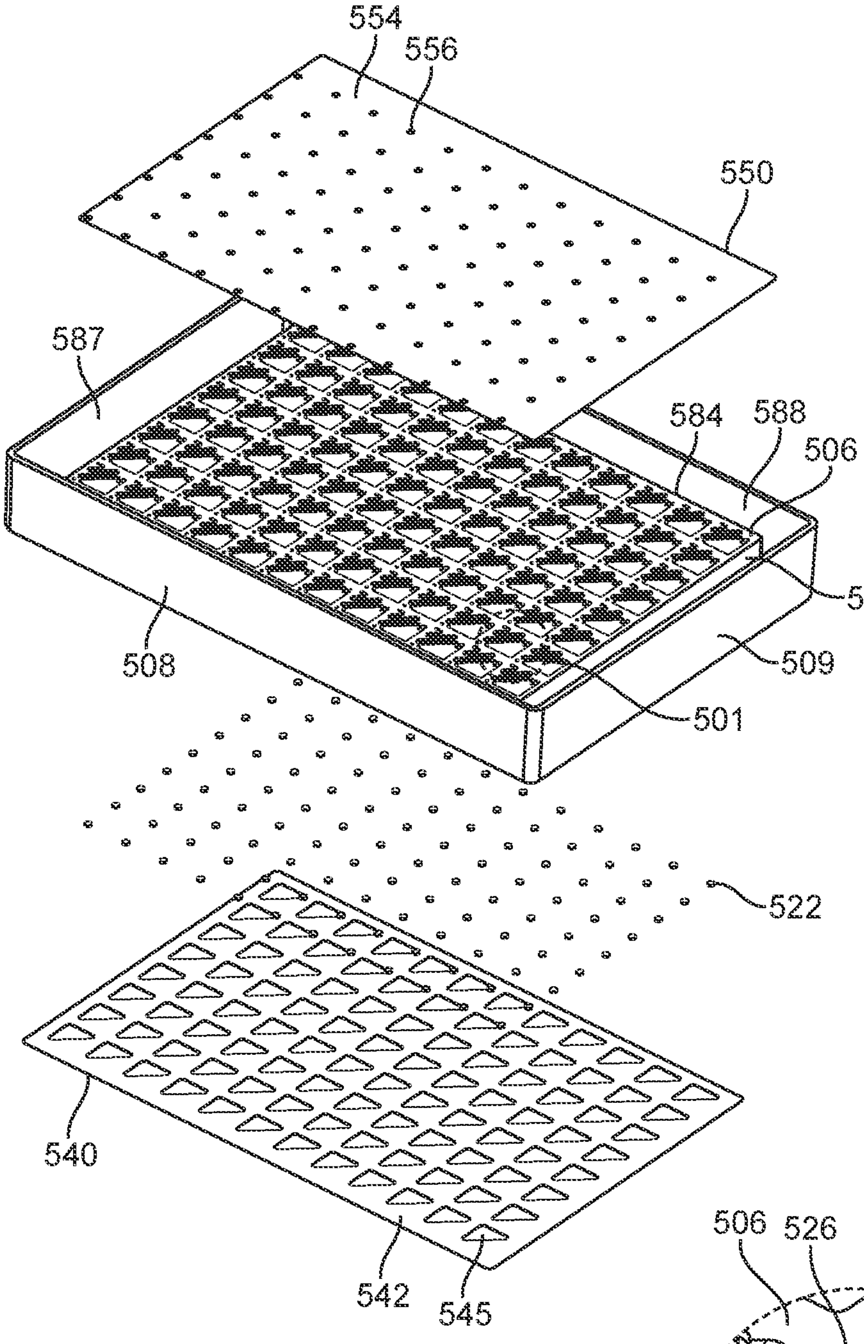
FIG. 12A is an exploded bottom perspective view of device 500 and FIG. 12B is an enlarged view of the portion in FIG. 12A defined by the broken circle.
Figure 12B:
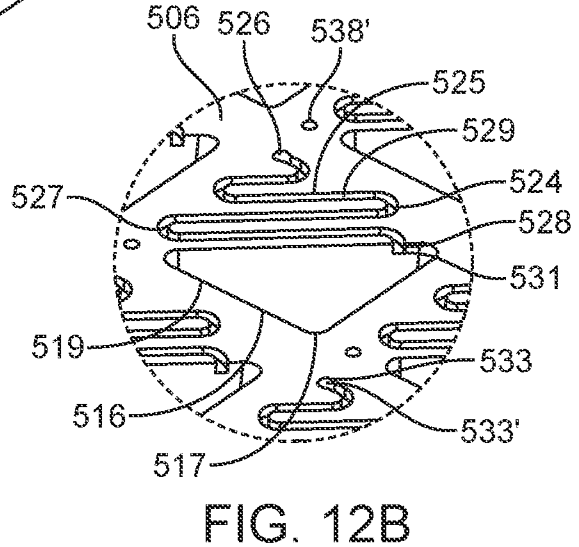
Figure 13A:
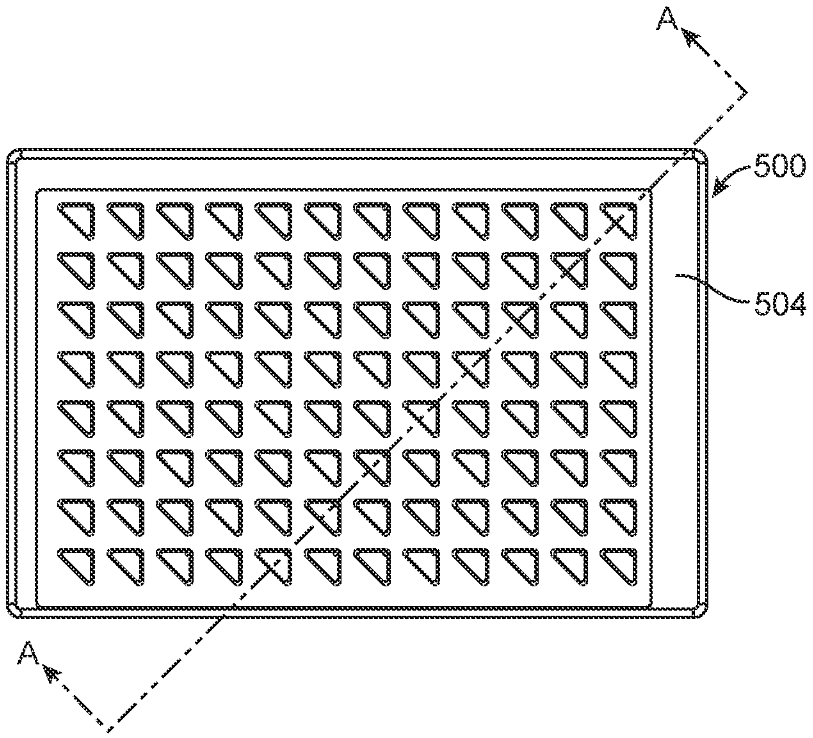
FIG. 13A is a top view of device 500 showing cutting plane A-A and FIG. 13B is a section view through cutting plane A-A.
Figure 13B:
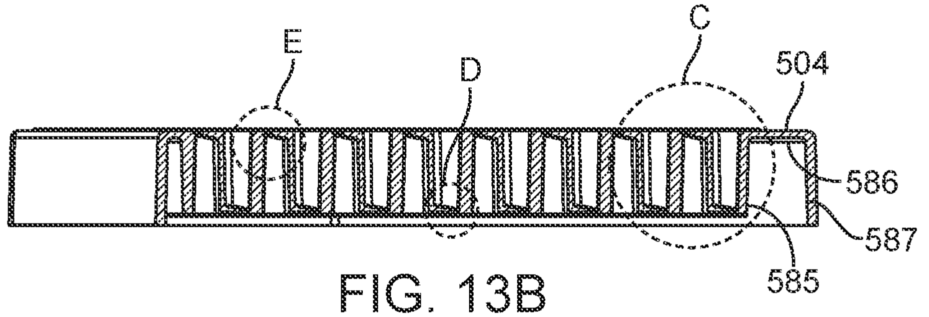
Figure 13C:
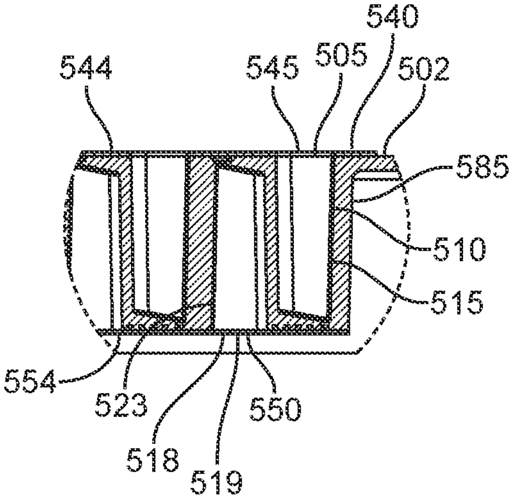
FIG. 13C, FIG. 13D and FIG. 13E each is an enlarged view of a portion in FIG. 13B defined by each designated broken circle.
Figure 14A:
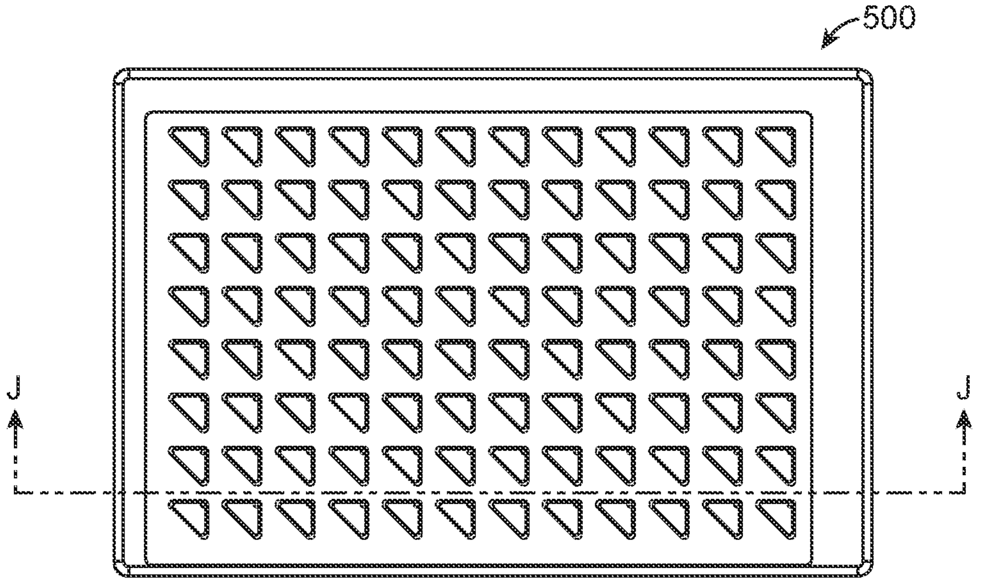
FIG. 14A is a top view of device 500 showing cutting plane J-J.
Figure 14B:
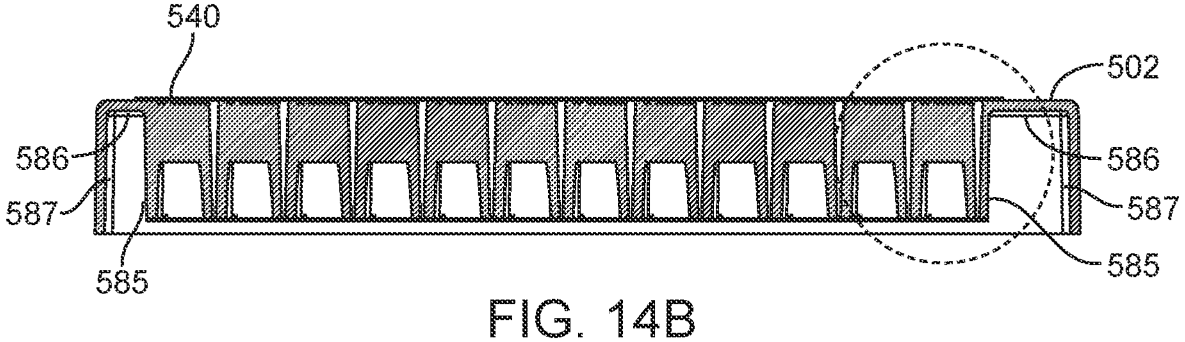
FIG. 14B is a section view through cutting plane J-J.

A second chamber sometimes includes an opening disposed at the second chamber posterior terminus and second chamber sidewall, and is disposed at a channel distal terminus (for example, device 500 illustrated in FIG. 13C). A second chamber posterior terminus sometimes is defined by a bore opening at a posterior surface of a substrate and a solid, coextensive portion of a joined posterior member (for example, device 500 illustrated in FIG. 13C). In certain implementations, a second chamber bore opening and channel cavity are disposed at a posterior surface of the substrate and the second chamber posterior terminus and channel posterior surface are defined by a solid coextensive portion of a posterior member anterior surface (for example, device 500 illustrated in FIG. 12B and FIG. 13C).

A calibration device typically includes a fluid path from the first chamber to the channel and from the channel to the second chamber. In certain implementations, a second chamber includes a side, and the distal terminus of the channel is disposed at the side and the anterior terminus of the second chamber (for example, device 100 illustrated in FIG. 5). In certain instances, the anterior terminus of the second chamber coincides with, or is disposed in a posterior position with respect to, the anterior surface of the channel distal terminus. In certain implementations, a second chamber includes a side, and the distal terminus of the channel is disposed at the side and the posterior terminus of the second chamber (for example, device 500 illustrated in FIG. 12B). In certain instances, the posterior terminus of the second chamber coincides with, or is disposed in a posterior position with respect to, the posterior surface of the channel distal terminus. Such orientations of the channel distal terminus and second chamber can facilitate the second chamber completely filling with dispensed fluid when a calibration device is in use. Each of the channel, first chamber, optional well and second chamber often is at a fixed position within a device and is not moveable within the device. The proximal terminus and distal terminus of the channel often is in a fixed (i.e., non-moveable) position relative to the first chamber, optional well and second chamber. In certain instances, each of the channel, first chamber, optional well and second chamber are disposed in a fixed position in a unitary device.

In certain instances, a calibration device includes a well in fluid connection with the first chamber. In certain implementations, a calibration device includes a fluid path from the first chamber to the well, from the well to the channel and from the channel to the second chamber. In certain instances, the well includes a side, and the proximal terminus of the channel is disposed at the side of the well. In certain implementations, a well includes an anterior opening, the anterior opening of the well is disposed in a posterior position relative to the posterior terminus of the first chamber, and sometimes the anterior opening of the well is concentrically aligned with the posterior terminus of the first chamber (for example, device 100 illustrated in FIG. 3A). In certain implementations, a well includes an anterior opening, the anterior opening of the well is disposed in a posterior position relative to the posterior terminus and posterior opening of the first chamber, and sometimes the anterior opening of the well is not concentrically aligned with the posterior terminus of the first chamber (for example, device 500 illustrated in FIG. 13D). A well sometimes is integrated with the first chamber, where the posterior terminus of the first chamber is joined to the anterior terminus of the well, and sometimes where the side(s) of the well are joined to the side(s) of the first chamber. A posterior terminus of a well sometimes coincides with, or is disposed in an anterior position relative to, a posterior terminus of the channel at the proximal terminus of the channel (at the connection of the channel with the well), which can facilitate the first chamber and well emptying of dispensed fluid after fluid flows in the calibration device when in use. In implementations in which a device contains no well, a posterior terminus of a first chamber sometimes coincides with, or is disposed in an anterior position relative to, a posterior terminus of the channel at the proximal terminus of the channel (at the connection of the channel with the first chamber), which can facilitate the first chamber emptying of dispensed fluid after fluid flows in the calibration device when in use.

Figure 19A:
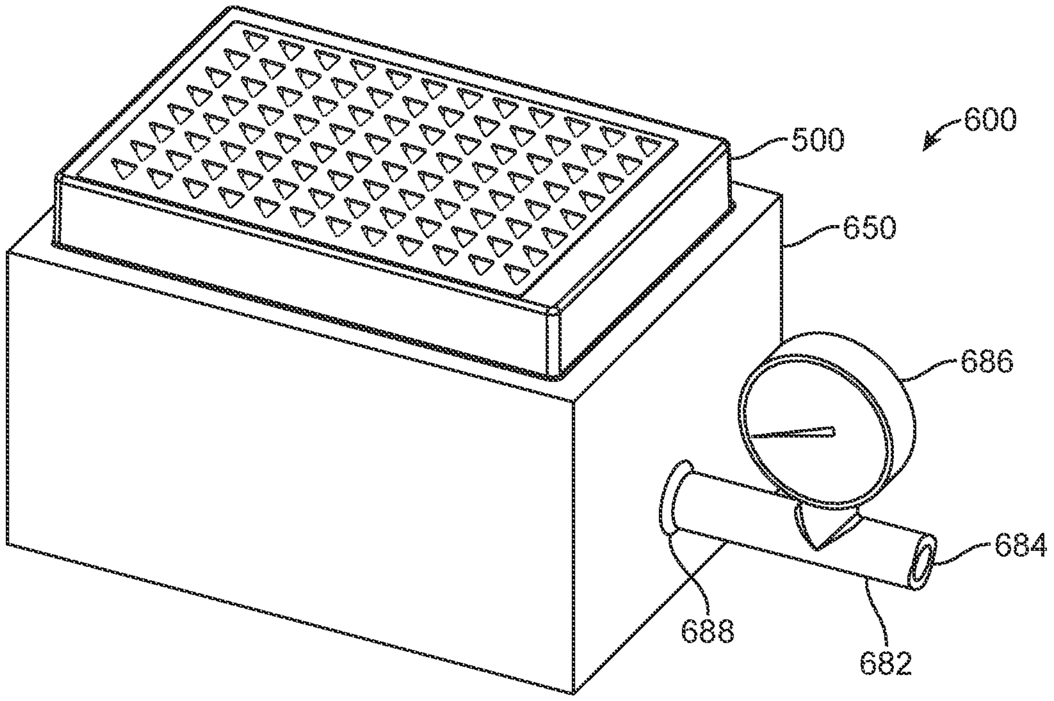
FIG. 19A is a top perspective view of assembly 600 containing device 500 and vacuum manifold 650.
Figure 19B:
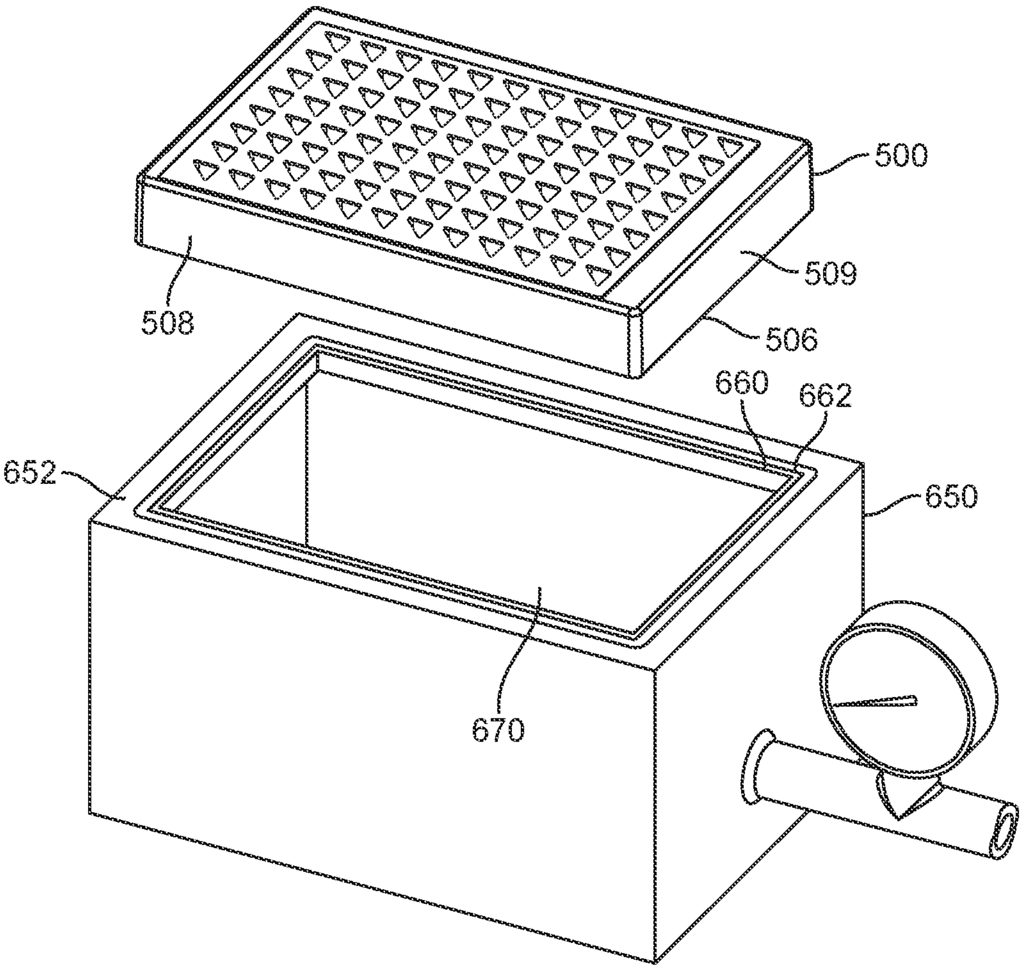
FIG. 19B is an exploded view thereof.

A hydrophobic membrane sometimes is disposed at or near a posterior surface of a device or an anterior surface of a device. For implementations in which fluid is motivated through a device by a pressure differential, a vacuum device sometimes is utilized to provide the pressure differential. A vacuum device sometimes is disposed in an assembly with a calibration device at or near the hydrophobic membrane. In certain implementations, a hydrophobic membrane sometimes is disposed at a posterior surface of a calibration device and a vacuum device is disposed in an assembly with a calibration device at or near the hydrophobic membrane (for example, device 100 illustrated in FIG. 3A). In such implementations a calibration device often does not include a duct in association with the hydrophobic membrane and another surface of the device due to proximity of the vacuum device with the hydrophobic membrane. In certain implementations, a hydrophobic membrane is disposed at or near an anterior surface of a calibration device and a vacuum device is disposed in an assembly with the calibration device at or near a posterior surface of the calibration device (for example, device 500 illustrated in FIG. 13E and assembly 600 illustrated in FIG. 19A). In such implementations, a calibration device often includes one or more ducts in association with the hydrophobic membrane and the posterior surface of the device due to separation of the vacuum device from the hydrophobic membrane. A duct often is a void in a device (for example, a void in a substrate of a device), and is of any suitable geometry that facilitates application of a vacuum and motivate fluid through a device. A duct sometimes is or includes a cylinder, cylindroid, cube or cuboid in certain implementations, and may include or be a frustrum (for example, a right frustrum, a truncated cone, a truncated pyramid). A wall of a duct may taper in the posterior-to-anterior direction or in the anterior-to posterior direction. A duct sometimes includes one or more curved portions. A duct sometimes is defined by a void in a substrate and a solid surface of a fused posterior member and/or anterior member. A duct sometimes is in direct contact with a hydrophobic membrane, and/or sometimes is in indirect void-volume association with a hydrophobic membrane. Void-volume association means that a duct is in indirect connection with a hydrophobic membrane via another void in a device.

Figure 14C:
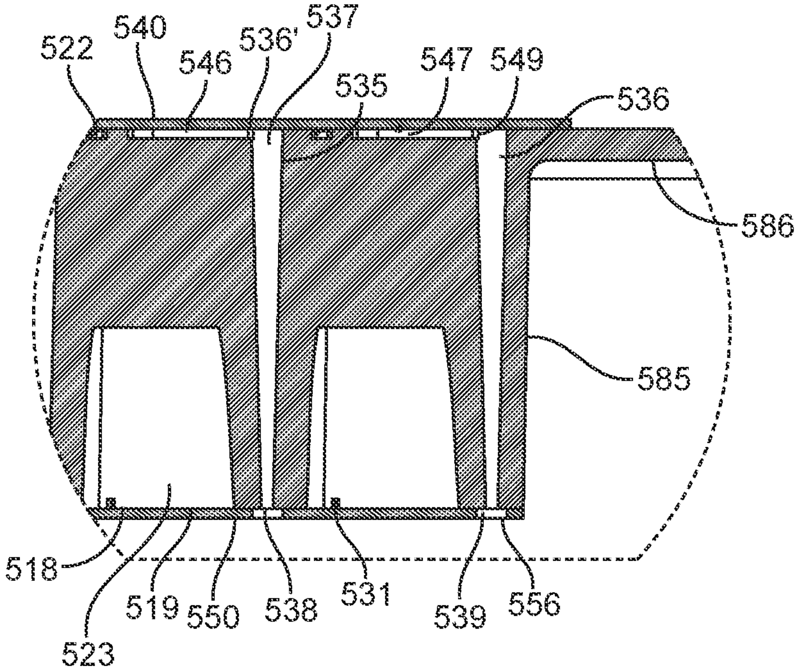
FIG. 14C is an enlarged view of the portion in FIG. 14B defined by the broken circle.

A calibration device may include a lateral duct (perpendicular or substantially perpendicular to the anterior-to-posterior direction), or an axial duct (parallel or substantially parallel to the anterior-to-posterior direction), or a combination of a lateral duct and axial duct, in direct or void-volume association with a hydrophobic membrane. In certain instances, a device includes a duct directly connected to a hydrophobic membrane, and sometimes a duct is connected to a side or posterior surface of a hydrophobic membrane. In certain instances, a device includes a duct connected to a junction that is directly connected to the duct and directly or indirectly connected to the hydrophobic membrane. In certain instances, a device includes a junction containing a hydrophobic membrane linking a second chamber anterior terminus opening or optional vent opening to a duct opening, such as a lateral duct opening for example. In certain instances a device includes a junction linking a first duct opening to a second duct opening, where the first duct and second duct are aligned in different orientations in the device. In certain implementations, a lateral duct is associated with an axial duct. A junction sometimes is defined by a bore and/or recess in a substrate of a device, and a solid coextensive portion of an anterior member or posterior member adjacent to and/or covering the bore and/or recess (for example, junction 570 of device 500 illustrated in FIG. 11B and FIG. 13C). A duct sometimes is defined by a bore and/or recess in a substrate of a device and a coextensive solid portion of an anterior member or posterior member adjacent to and/or covering the bore and/or recess (for example, lateral duct 546 in device 500 illustrated in FIG. 11B and FIG. 13C, and axial duct 535 illustrated in FIG. 14C). A duct sometimes includes an opening in a substrate of a device and the opening is disposed adjacent to, coextensive with, and/or or coaxially with a bore of an anterior member or posterior member (for example, axial duct posterior terminus 538 is coaxially aligned with posterior member bore 556 in device 500 as illustrated in FIG. 14C).

Figure 5:
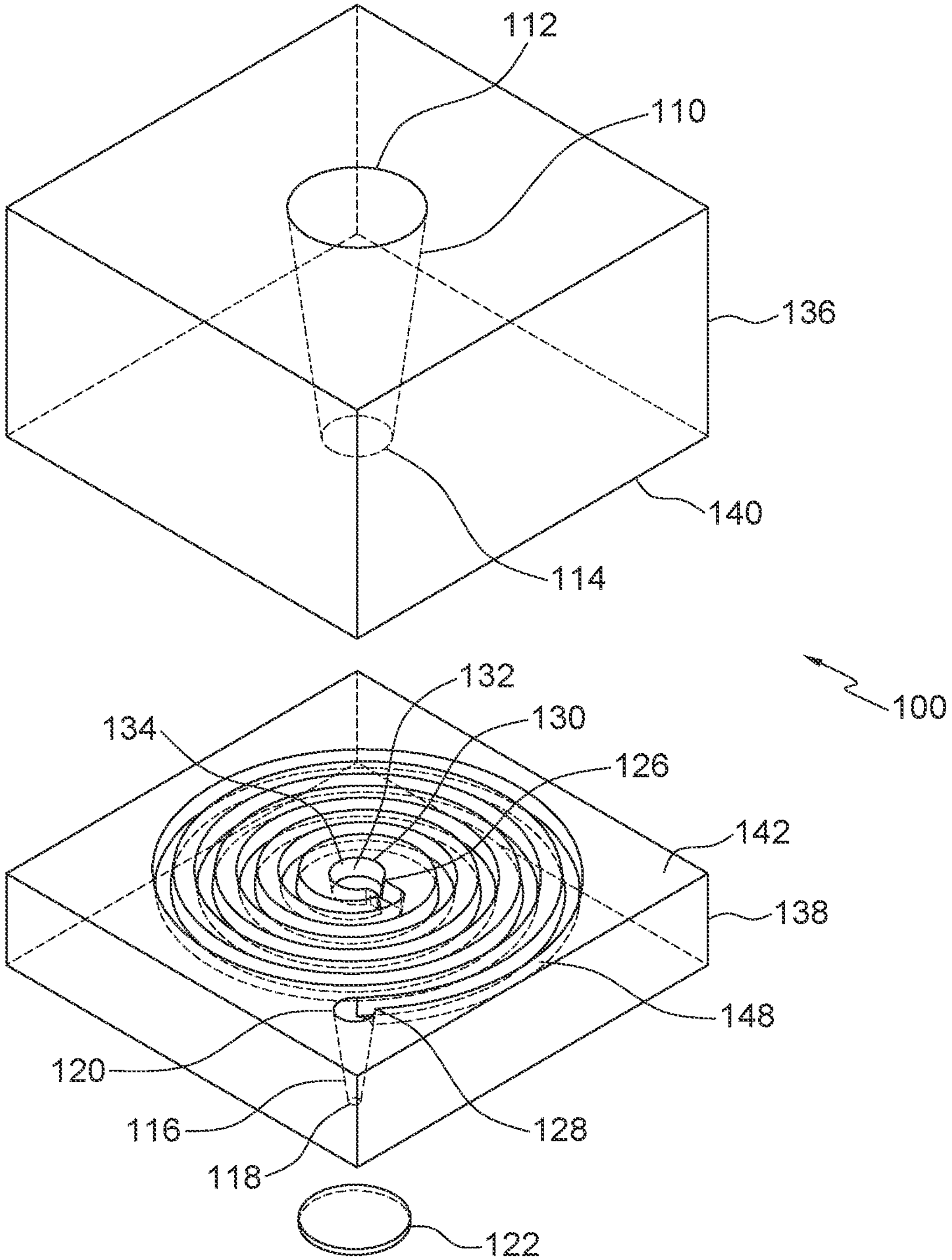
FIG. 5 is an exploded view of device 100.

In certain implementations, a substrate includes an anterior section and a posterior section fused to the anterior section (for example, device 100 illustrated in FIG. 5). An anterior section sometimes includes the first chamber and a posterior section sometimes includes the second chamber and the hydrophobic membrane. A posterior section sometimes includes at least a portion of the channel. In certain instances, the channel includes an anterior surface, a posterior surface and a side, where the posterior surface and the side of the channel are disposed in the posterior section, and where the anterior surface of the channel is defined by a posterior surface of the anterior section bonded to the posterior section. In certain implementations, a well is disposed in a posterior section of a calibration device.

In certain implementations, a device includes a substrate, an anterior member fused to all or a portion of the substrate anterior surface and a posterior member fused to all or a portion of the substrate posterior surface (for example, device 500 illustrated in FIG. 13C). A substrate sometimes includes a first channel bore with an anterior opening disposed at an anterior substrate surface, optional well in association with the first chamber, channel cavity disposed at a posterior substrate surface in association with the first chamber or optional well, second channel bore with a posterior opening disposed at a posterior substrate surface and in association with the channel, an optional vent in association with the second channel bore, an optional lateral duct cavity, an optional axial duct, and an optional junction between the second chamber or optional vent and optional lateral duct. An anterior member can include a bore coextensive with an anterior first chamber bore opening, can include a solid portion adjacent to and/or that covers a hydrophobic membrane, optional junction between the second chamber or optional vent and optional lateral duct, can include a solid portion adjacent to and/or that covers an optional lateral duct cavity, and/or can include a solid portion adjacent to and/or that covers an optional axial duct anterior opening. A posterior member can include a bore adjacent to and/or coextensive with a posterior terminus of an optional axial duct, can include a solid portion adjacent to and/or that covers a substrate second chamber posterior bore opening, can include a solid portion adjacent to and/or that covers a substrate channel cavity and/or recess, and can include a solid portion adjacent to and/or that covers a posterior first chamber posterior opening or optional well posterior opening. A fluid flow path in a calibration device generally is from the first chamber, to an optional well, to the channel and to the second chamber. Each of the first chamber, optional well, channel and second chamber typically is a void within a calibration device. A fluid flow path sometimes includes an optional vent, which typically is a void in a device between the second chamber and hydrophobic membrane. A fluid flow path often is to, and often terminates at, a hydrophobic membrane in a device. A fluid flow path (for example, from the first chamber, to an optional well, to the channel, to the second chamber, to an optional vent and to a hydrophobic membrane) often is substantially smooth and often contains smooth transitions that facilitate fluid flow and negligible retention of fluid in a portion of the fluid flow path proximal to a fluid endpoint (addressed herein). Interior surfaces in a fluid flow path often contain smooth transitions, such as curved surfaces, tapered surfaces, flared surfaces and the like, for example. Interior surfaces in a fluid flow path often do not contain pockets, voids or sharp transitions that are likely to retain fluid in a region of the flow path proximal to a fluid endpoint disposed between the channel proximal terminus and channel distal terminus. In certain implementations, a channel includes an interior surface and at a least portion of the interior surface of the channel is hydrophobic (for example, a portion or all of the interior surface of the channel is hydrophobic). In certain instances, a first chamber and/or a second chamber each includes an interior surface and at least a portion of the interior surface of the first chamber and/or the second chamber is hydrophobic (for example, a portion or all of the interior surface of the first chamber and/or second chamber is hydrophobic). In certain instances, an optional well includes an interior surface and at least a portion of the interior surface of the well is hydrophobic (for example, a portion or all of the interior surface of well is hydrophobic). In certain instances, an optional vent includes an interior surface and at least a portion of the interior surface of the vent is hydrophobic (for example, a portion or all of the interior surface of vent is hydrophobic). In certain instances, an interior surface of a chamber (first chamber, second chamber), channel, optional well and/or optional vent is not coated and sometimes is a surface of a cavity within a substrate that contains a hydrophobic material. In certain instances, the substrate includes a hydrophobic material; the channel, first chamber, optional well, second chamber and optional vent is defined by a void in the substrate; and the sidewall of the channel, first chamber, optional well, second chamber and optional vent contains the hydrophobic material. In certain instances, a portion of a channel and/or second chamber is defined in part by a posterior member, and at least the portion of the posterior member defining the portion of the channel and/or second chamber contains a hydrophobic material. In certain instances, at least a portion of the interior surface of the channel, first chamber, optional well, second chamber and/or optional vent includes a coating that contains a hydrophobic material. In certain instances, a portion of a channel and/or second chamber is defined in part by a posterior member, and at least the portion of the posterior member defining the portion of the channel and/or second chamber includes a coating that contains a hydrophobic material. Any hydrophobic material can be selected that is suitable for fluid transmission through the channel, first chamber, optional well, second chamber and/or optional vent, and/or formation of a continuous fluid volume (i.e., a fluid slug) distal to a dispensed fluid endpoint and proximal to the hydrophobic membrane. Such a hydrophobic material can facilitate formation of a continuous fluid volume by precluding or substantially precluding dispensed fluid in a fluid flow path proximal to the dispensed fluid endpoint, and/or by precluding or substantially precluding detectable bubbles (for example, air bubbles) in the dispensed fluid volume distal to the dispensed fluid endpoint and proximal to the hydrophobic membrane. A non-limiting example of a hydrophobic material is a moldable plastic such as polypropylene or polystyrene for example. In certain implementations, a surface of one or more of the channel, first chamber, optional well, second chamber and/or optional vent is hydrophilic, and optionally, a surface of one or more of the channel, first chamber, optional well, second chamber and/or optional vent is hydrophobic.

A hydrophobic membrane can include any hydrophobic material suitable for one or more of the following: (i) fluid flow through a channel into the second chamber; (ii) filling of the second chamber and optional vent without escape of fluid out of the second chamber and optional vent through the hydrophobic membrane; (iii) application of a pressure differential in the device (for example, application of a pressure differential between the pressure in the device and the pressure outside of the device); (iv) formation of a continuous fluid volume (i.e., a fluid slug) distal to the dispensed fluid endpoint and proximal to the hydrophobic membrane; and (v) precluding or substantially precluding detectable bubbles (for example, air bubbles) in the dispensed fluid volume distal to the dispensed fluid endpoint and proximal to the hydrophobic membrane. A hydrophobic membrane often is porous, which can facilitate application of a pressure differential in a calibration device. In certain instances, a hydrophobic membrane includes polytetrafluoroethylene (PTFE) and has an average pore size of about 0.05 micrometers to about 0.5 micrometers (for example, about 0.25 micrometers). In certain implementations, a hydrophobic membrane is a disk.

Figure 3B:
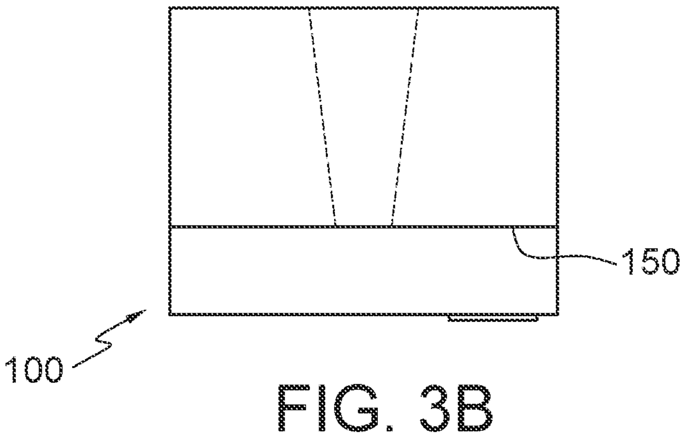
Figure 4B:
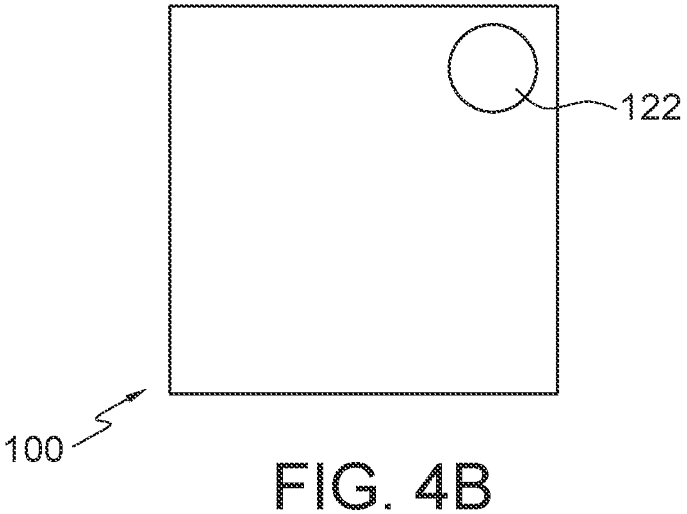

A hydrophobic membrane sometimes includes a width (for example, minor width) larger than a width (for example, major width) of an opening in the device at which the membrane is disposed. In certain instances, a second chamber includes a posterior opening smaller than the width of the hydrophobic membrane in contact with the opening (for example, device 100 illustrated in FIG. 3B). A periphery of an anterior surface of a hydrophobic membrane in contact with a posterior surface of a substrate sometimes is bonded to the posterior surface of the substrate. A hydrophobic membrane sometimes is concentric with a posterior opening of a second chamber of a calibration device. In certain instances, a second chamber includes an anterior terminal opening, and/or optional vent anterior opening, smaller than the width of the hydrophobic membrane in contact with the opening (for example, device 500 illustrated in FIG. 13E). In certain implementations, a hydrophobic membrane is disposed in a recess disposed at a surface or near a surface of a device. A hydrophobic membrane sometimes is disposed in a recess disposed in an anterior surface of a substrate, a posterior surface of the membrane sometimes contacts a surface of the recess (also referred to as recessed surface) and/or an anterior terminal opening of a second chamber or optional vent sometimes is disposed at the recessed surface (for example, device 500 illustrated in FIG. 13E).

In certain implementations, a fluid path in a calibration device includes a first chamber, a second chamber, and a channel that includes a proximal terminus in fluid connection with the first chamber and a distal terminus in fluid connection with the second chamber. In certain instances, a fluid path in a calibration device includes a first chamber, a second chamber, a well in fluid connection with a posterior terminus of the first chamber, and a channel that includes a proximal terminus in fluid connection with the well and a distal terminus in fluid connection with the second chamber. In certain implementations, a fluid path in a calibration device includes a first chamber, a second chamber, a well disposed at a posterior terminus of the first chamber and joined to the first chamber, and a channel that includes a proximal terminus joined to a sidewall of the well and a distal terminus joined to a sidewall of the second chamber. A fluid path often ends at a hydrophobic membrane in a calibration device. In certain instances, a fluid path in a calibration device includes an optional vent between the second chamber and a hydrophobic membrane. In certain implementations, (i) a first chamber and/or well is joined to a single channel and is not joined to multiple channels, (ii) a second chamber is joined to a single channel and is not joined to multiple channels, (iii) the first chamber and/or well, and the second chamber, are joined to one channel and to the same channel, (iv) the channel is not branched, and (v) a combination of two, three or all of (i), (ii), (iii) and (iv).

In most instances, a fluid path extends from the first chamber and terminates at a hydrophobic membrane. In most instances, after dispensed fluid has flowed in a calibration device, a continuous fluid volume extending from a fluid endpoint in the channel (i.e., the endpoint being disposed between the proximal terminus and the distal terminus of the channel) to the distal terminus of the channel, to the second chamber, to an optional vent, and ending at the hydrophobic membrane, is determined based on the location of the fluid endpoint in the channel (described herein). In such implementations, a dispensed fluid volume is defined from an endpoint at the hydrophobic membrane backwards to the fluid endpoint within the channel.

A fluid path typically is within a cavity or void in a calibration device, and in certain instances, interior surfaces of the entire cavity are hydrophobic, for example, are disposed in a hydrophobic substrate and/or are coated with a hydrophobic coating. An entire cavity in a calibration device sometimes does not include a hydrophilic surface, and sometimes does not include a capillary channel (for example, a channel that flows fluid by capillary action). In certain implementations, fluid is motivated to flow through a calibration device by an externally applied force. Motivation of fluid flow in a calibration device sometimes is provided by a pressure differential in a calibration device that includes dispensed fluid. A pressure differential sometimes is between pressure in a fluid flow path cavity in a calibration device and pressure outside of the device, and sometimes is between pressure in the first chamber and pressure at the hydrophobic membrane. A pressure differential can be generated by exposing a calibration device to a vacuum (described herein). In certain implementations, a calibration device includes a vacuum seal, which sometimes is (i) a protrusion or rib disposed at a side in a posterior region of a calibration device, and sometimes surrounding a perimeter of the calibration device, (ii) a protrusion or rib disposed at or adjacent to a hydrophobic membrane on the posterior surface of a calibration device (for example, annular protrusion, rib grid), or (iii) a combination of (i) and (ii). In certain instances, fluid is motivated to flow through a calibration device by a exposing a calibration device to a centrifugal force (for example, generated by placing a calibration device in a centrifuge). In certain instances, fluid is not motivated to flow through a calibration device by capillary action.

In certain implementations, an external force (for example, pressure differential, vacuum) is applied to a calibration device, fluid is motivated in a fluid path through the device, and the fluid delivered to the device is retained in the device. In certain implementations, a measurable amount of fluid does not exit the device. In certain implementations, a measurable amount of fluid does not exit the device through a hydrophobic membrane disposed at the end of the fluid path. Fluid often flows in a device in an anterior-to-posterior direction within and from a first chamber and optional well, and often flows in a lateral direction (i.e., perpendicular to the anterior-to-posterior direction) in a channel. Fluid sometimes flows in an anterior-to-posterior direction within a second chamber to an interior surface (for example, anterior surface) of a hydrophobic membrane. In certain instance, fluid flows in a posterior-to-anterior direction within a second chamber, and optionally in a posterior-to-anterior direction within an optional vent, to a surface (for example, posterior surface) of a hydrophobic membrane. After fluid in a device flows and flow of fluid stops, fluid typically is disposed in the device as a continuous (i.e., non-interrupted) fluid volume having a proximal terminus and a distal terminus, where the proximal terminus is disposed in a channel as a fluid endpoint and the distal terminus is disposed at an interior surface (for example, anterior surface; posterior surface) of a hydrophobic membrane. After flow of fluid stops, the fluid endpoint typically is not disposed in the first chamber or optional well, and the fluid endpoint typically is disposed in a portion of the channel between the channel distal terminus and channel proximal terminus. After flow of fluid stops, fluid typically fills a portion of the channel in a distal orientation to the channel fluid endpoint, fills the second chamber, and fills an optional vent if present, to a surface of a hydrophobic membrane. The void volume from the channel proximal terminus to an interior surface of the hydrophobic membrane at the end of the fluid flow path (for example, a void volume sum of the channel, second chamber, and optional vent (if present) void volumes) typically is larger than the fluid volume delivered to a calibration device.

In specific implementations, features of a volume calibration device are illustrated for device 100 in FIG. 1 to FIG. 5. Device 100 includes no dispensed fluid from a fluid dispenser. Device 100 includes substrate 102, substrate anterior surface 104, substrate posterior surface 106 and substrate side surface 108. In an anterior portion, device 100 includes first chamber 110, which includes anterior opening 112, posterior terminus 114 and an interior sidewall. First chamber 110 is a frustrum (i.e., right frustrum, truncated cone) having an interior sidewall that tapers from anterior opening 112 to posterior terminus 114.

In a posterior position relative to posterior terminus 114 of first chamber 110, disposed in device 100 is well 130 that includes side 132 and anterior opening 134. Well 130 is a cylinder, with the posterior terminus of the well having the same surface area as anterior opening 134, and with side 132 of well 130 perpendicular to anterior surface 104.

In a posterior portion, device 100 includes second chamber 116, which includes opening 118, anterior terminus 120 and an interior sidewall. Second chamber 116 is a frustum (i.e., right frustrum, truncated cone) having an interior sidewall that flares from posterior opening 118 to anterior terminus 120. At a posterior surface, and disposed at posterior opening 118, device 100 includes a bonded hydrophobic membrane 122.

Device 100 includes anterior section 136 bonded to posterior section 138. Anterior section 136 includes posterior surface 140, and posterior section 138 includes anterior surface 142. Device 100 includes junction 150 between posterior surface 140 and anterior surface 142, at which surface 140 is bonded to surface 142.

Within the body of substrate 102, device 100 includes channel 124, which includes proximal terminus 126 disposed at side 132 of well 130. Channel 124 includes distal terminus 128, which is disposed at posterior terminus 120 and a side of second chamber 116. Channel 124 is spirally disposed in substrate 102, where channel 124 winds around virtual center point 190. Virtual center point 190 is concentric with the center point of posterior terminus 114 of first chamber 110, and is concentric with the center point of anterior opening 134 of well 130. Channel 124 includes channel anterior surface 144, which is disposed at and defined by posterior surface 140 of anterior section 136. Channel 124 also includes channel posterior surface 146 and channel side 148, which are disposed in posterior section 138. Device 300 includes the same features as device 100 (for example, channel 124 in device 100 corresponds to channel 324 of device 300, first chamber 110 of device 100 corresponds to first chamber 310 in device 300, and the like), except that device 300 includes dispensed fluid 290 and device 100 includes no dispensed fluid.

In certain implementations, a volume calibration device includes at least one calibration unit, where the calibration unit includes the first chamber, the second chamber and the channel, and optionally includes the hydrophobic membrane. In certain instances, a calibration device includes two or more calibration units. In a calibration device, a plurality of calibration units can be arranged in series (for example, single row of calibration units; for use with a manually operated multichannel dispenser) and/or in an array (for example, for use with an automated multichannel dispenser). A device sometimes contains an array of about 8 calibration units to about 1536 calibration units (for example, 8, 12, 96, 384, 1536 calibration units). An array of calibration units often is a two-dimensional array, which can include any suitable number of calibration units in rows and in columns (for example, an array containing 8 rows and 12 columns of units, an array containing 32 rows and 48 columns of units, an array containing 128 rows and 192 columns of units).

In a device that includes a series and/or an array of calibration units, the center of each calibration unit often is aligned with a counterpart dispenser element that dispenses fluid into the device. A calibration device having standardized dimensions can be registered relative to a fluid dispensing device (i.e., liquid handler device) having a precisely aligned nest configured to receive the calibration device. A perimeter of a calibration device having standardized dimensions sometimes conforms to a Society for Biomolecular Screening (SBS) standard labware footprint (i.e., 5.03 inches by 3.365 inches). In certain implementations, the center of each calibration unit is spaced a uniform distance from the center of an adjacent calibration unit in a series and/or array of calibration units. In certain implementations, the center of each calibration unit is spaced 9 millimeters or 4.5 millimeters from the center of an adjacent calibration unit.

In specific implementations, features of device 400 that includes an array of calibration units 460 is illustrated in FIG. 9A to FIG. 9E. Device 400 includes substrate 402, which includes anterior surface 404, posterior surface 406 and side surface 408. Device 400 includes a plurality of calibration units 460 arranged in an 8×12 array (i.e., 96 calibration units 460). Each calibration unit 460 includes first chamber 410, which includes anterior opening 412 and posterior terminus 414. Disposed in a posterior position relative to first chamber 410 in each calibration unit 460 is well 430, which includes well side 432 and well anterior opening 434. Each calibration unit 460 also includes second chamber 416, which includes posterior opening 418 and anterior terminus 420. Each calibration unit 460 includes hydrophobic membrane 422 bonded to posterior surface 406 at posterior opening 418 of second chamber 416. Device 400 includes anterior section 436 bonded to posterior section 438 at junction 450. Anterior section 436 includes posterior surface 440 and posterior section 438 includes anterior surface 442, where surface 440 is bonded to surface 442. Perimeter dimensions (i.e., length and width) of posterior section 438 define a SBS footprint, with the center of each calibration unit 460 spaced 9 millimeters from the center of an adjacent calibration unit 460. In each calibration unit 460, well 430 is in connection with channel 424, which includes channel proximal terminus 426 (in connection with well 430), channel distal terminus 428 (in connection with second chamber 416), channel anterior surface 444 (defined by posterior surface 440), and channel posterior surface 446 and channel side 448 (disposed in posterior section 428). Channel 424 is spirally disposed around virtual center point 490 in each calibration unit 460.

In a specific implementation, features of volume calibration device 500 are illustrated in FIG. 10A to FIG. 18C. Volume calibration device 500 shown in FIG. 10A to FIG. 18C contains no fluid. Device 500 includes an array of calibration units with each calibration unit 501 capable of receiving a separate dispensed fluid volume for determining the delivered fluid volume. Device 500 includes substrate 502. The substrate anterior surface 504 is bonded to the posterior surface 542 of anterior member 540. The substrate posterior surface 506 is bonded to the anterior surface 552 of posterior member 550. Substrate 502 includes exterior wall exterior surface 508 and 509

Substrate 502 includes a substrate first chamber bore 503 that includes bore opening 505 disposed at the substrate anterior surface 504. Each first chamber 510 of device 500 (also referred to as a “sample port”) is defined in part by bore 503 in substrate 502 and a coextensive counterpart bore 545 of bonded anterior member 540. Each bore opening 512 in substrate 502 and each coextensive counterpart bore 545 of bonded anterior member 540 are triangular. Each first chamber 510 includes an anterior opening 512, a posterior surface 513 (also referred to as a “floor”), posterior terminus 514, and posterior opening 511 (also referred to as a port) disposed at terminus 514. Posterior surface 513 is triangular and slopes in an anterior-to-posterior direction 599 from one side of first chamber 510 towards an opposing side of first chamber 510 and to posterior terminus 514, facilitating fluid transmitting and emptying from, first chamber 510. At least one sidewall 515 of first chamber 510 tapers in the anterior-to-posterior direction 599, which also can facilitate fluid transmitting and emptying from first chamber 510.

Figure 13D:
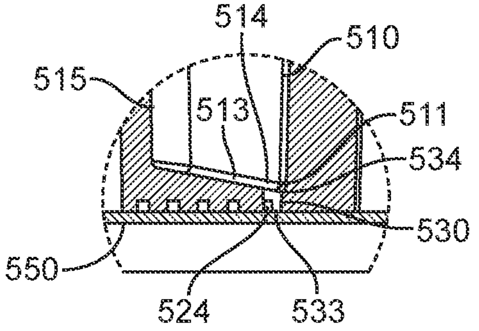

A posterior portion of first chamber 510 at opening 511 is joined to an anterior portion of optional well 530. Well 530 is a void or bore in substrate 502 and is a conical frustrum including sidewall 532 that tapers in the anterior-to-posterior direction 599 from anterior terminus 534 to posterior terminus 533. Posterior terminus opening 511 of first chamber 510 is disposed at well anterior terminus 534. Well 530 includes posterior port 533' disposed at well posterior terminus 533 and well sidewall 532 and at channel proximal terminus 526. A solid portion of anterior surface 552 of posterior member 550 disposed under well 530 forms an internal posterior floor surface of the well at the well posterior terminus 533, as illustrated in FIG. 13D.

Well posterior port 533' is disposed at proximal terminus 526 of channel 524. Channel 524 (also referred to as a “sample channel”) includes distal terminus 528 and interior wall 529. Channel 524 is a void or groove disposed in substrate 502 in a switchback orientation, which includes lateral members 525 and transition members 527. Channel 524 illustrated in FIG. 12B includes three lateral member 525, with different lengths, each lateral member being shorter than the preceding adjacent lateral member in the proximal-to-distal direction of channel 524. Lateral members 525 each are of a different length from another lateral member 525 in a single calibration unit 501, and are of successively smaller lengths from channel proximal terminus 526 to channel distal terminus 528. Each of two lateral members 525 are joined by a curved transition member 527. Channel 524 in device 500 includes a rectangular cross section. Channel 524 includes anterior surface 560, posterior surface 562 and sidewall 564 as interior surfaces. A solid portion of anterior surface 552 of posterior member 550 disposed under channel 524 forms an internal posterior floor surface 562 of the channel, as illustrated in FIG. 13D.

Figure 15A:
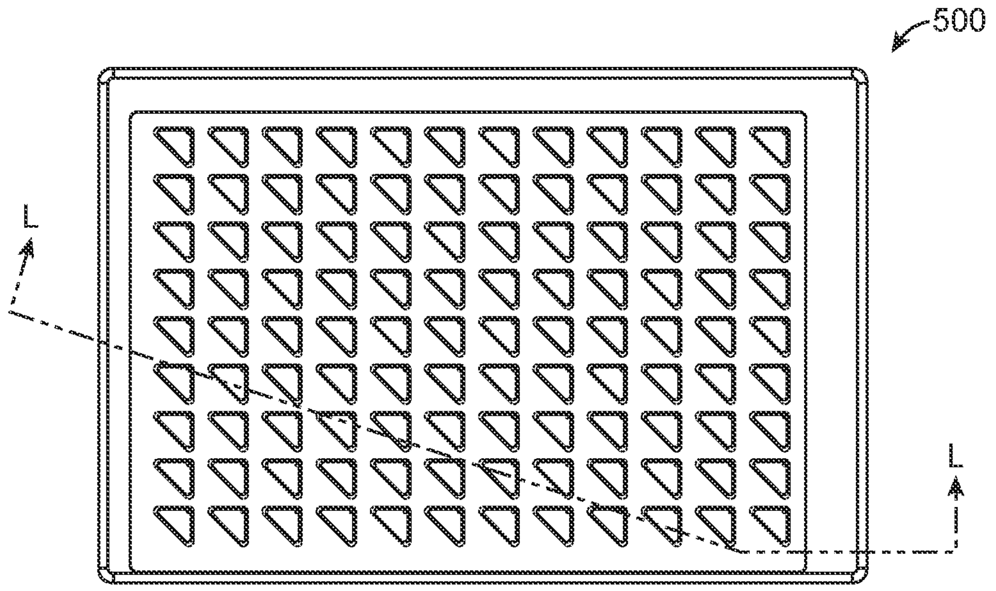
FIG. 15A is an enlarged top view of device 500 showing cutting plane L-L.
Figure 15B:
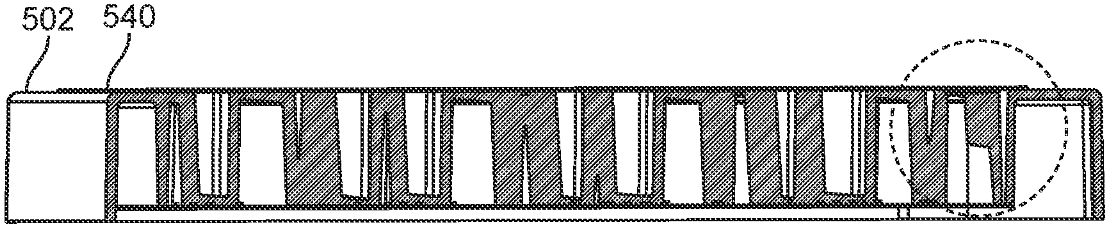
FIG. 15B is a section view through cutting plane L-L.
Figure 15C:
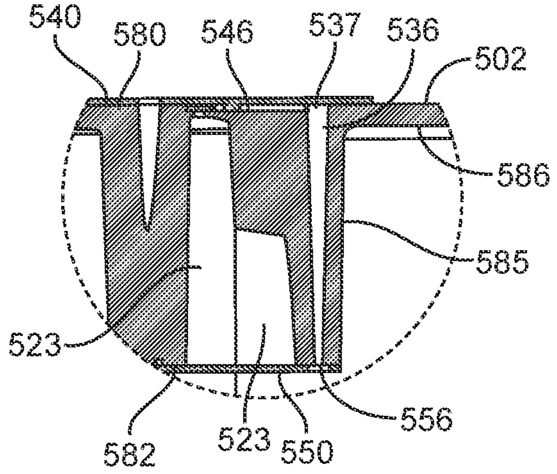
FIG. 15C is an enlarged view of the portion in FIG. 15B defined by the broken circle.

Distal terminus 528 of channel 524 is disposed at second chamber 516. Second chamber 516 is defined in part by bore 517, which includes posterior opening 519. Second chamber 516 includes posterior terminus 518, anterior surface 521 (also referred to as a “ceiling”), anterior terminus 520, and sidewall 523. Second chamber 516 includes two openings: posterior opening 531 disposed at a sidewall of second chamber 516 and at posterior terminus 518, and anterior opening 520' disposed at anterior terminus 520 and at anterior surface 521. Posterior opening 519 is triangular. Anterior surface 521 is triangular and slopes in a posterior-to-anterior direction 598 from one side of second chamber 516 towards an opposing side of second chamber 516 and to anterior terminus 520, facilitating fluid transmitting to anterior opening 520'. At least one sidewall 523 of second chamber 516 tapers in the posterior-to-anterior direction 598, as illustrated in FIG. 14C and FIG. 15C (a posterior portion of sidewall 523 of second chamber 516 is shown due to the sidewall tapering in the posterior-to-anterior direction out of the cutting plane). A solid portion of anterior surface 552 of posterior member 550 disposed under second chamber 516 forms an internal posterior floor surface at posterior terminus 518 and at substrate bore posterior opening 519 of second chamber 516, as illustrated in FIG. 13D.

Figure 16A:
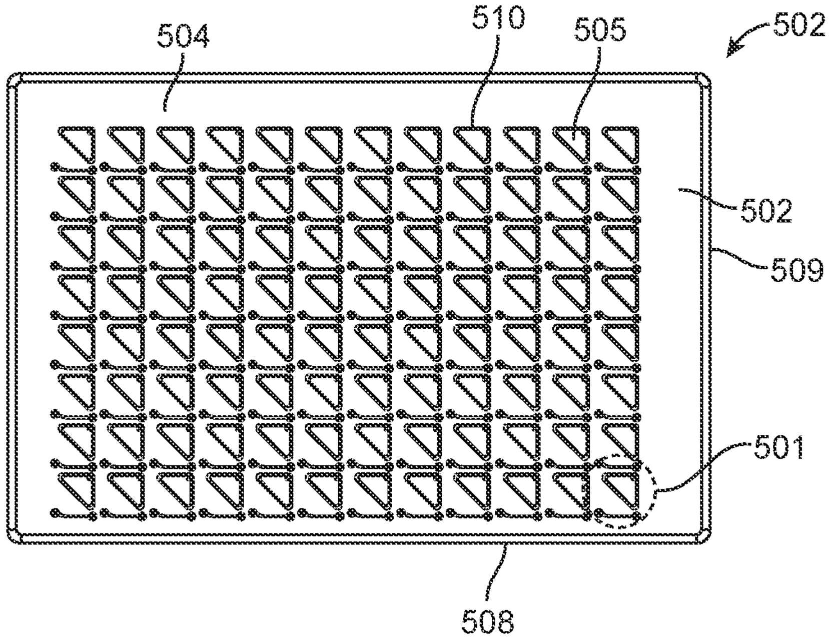
FIG. 16A is a top view of substrate 502 of device 500 containing an array of calibration units 501.
Figure 16D:
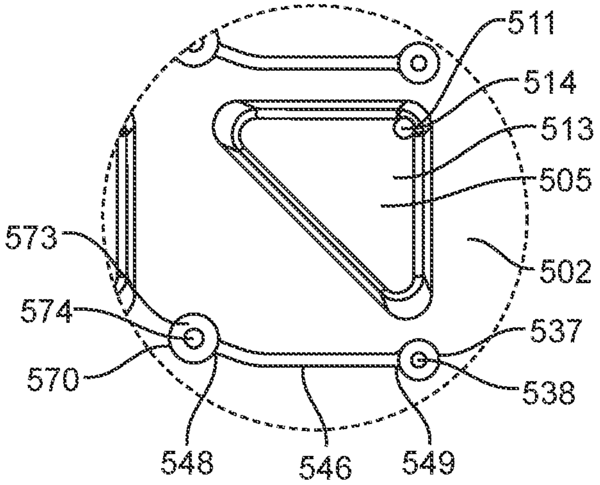
FIG. 16D is an enlarged view of the portion in FIG. 16A defined by the broken circle.
Figure 16B:
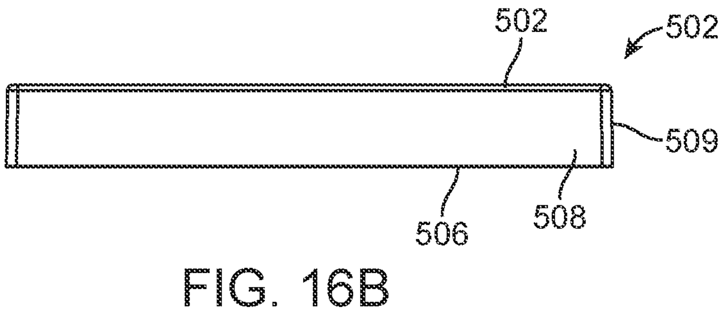
FIG. 16B is a side view thereof.
Figure 16C:
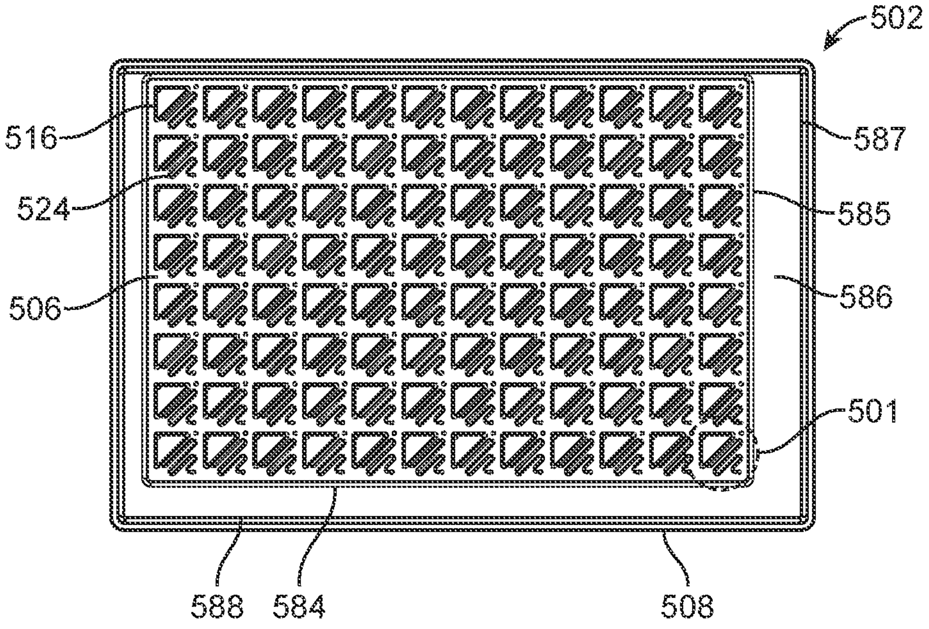
FIG. 16C is a bottom view thereof.
Figure 16E:
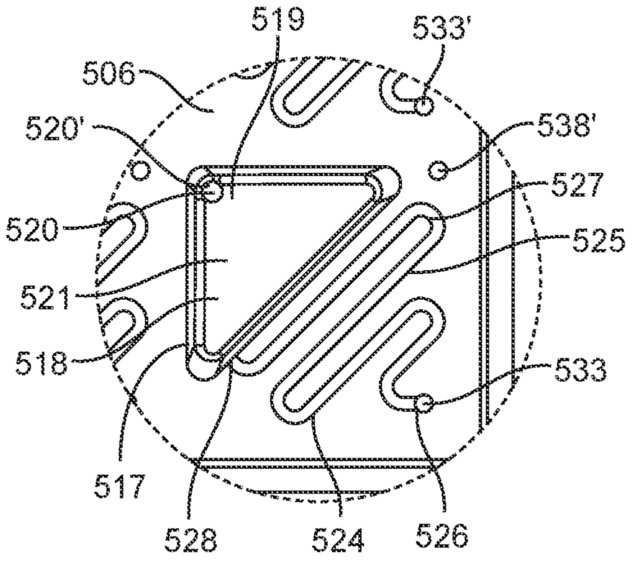
FIG. 16E is an enlarged view of the portion in FIG. 16C defined by the broken circle.
Figure 17A:
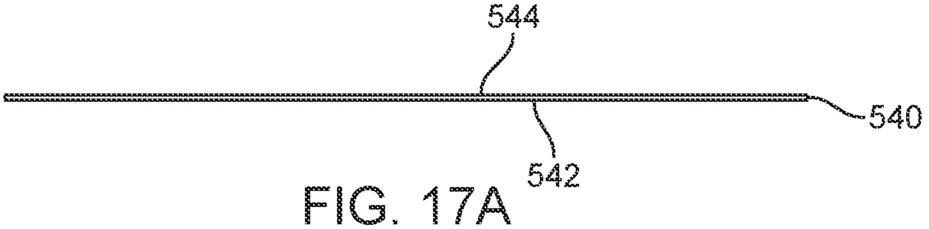
FIG. 17A is a side view of anterior member 540 of device 500.
Figure 17B:
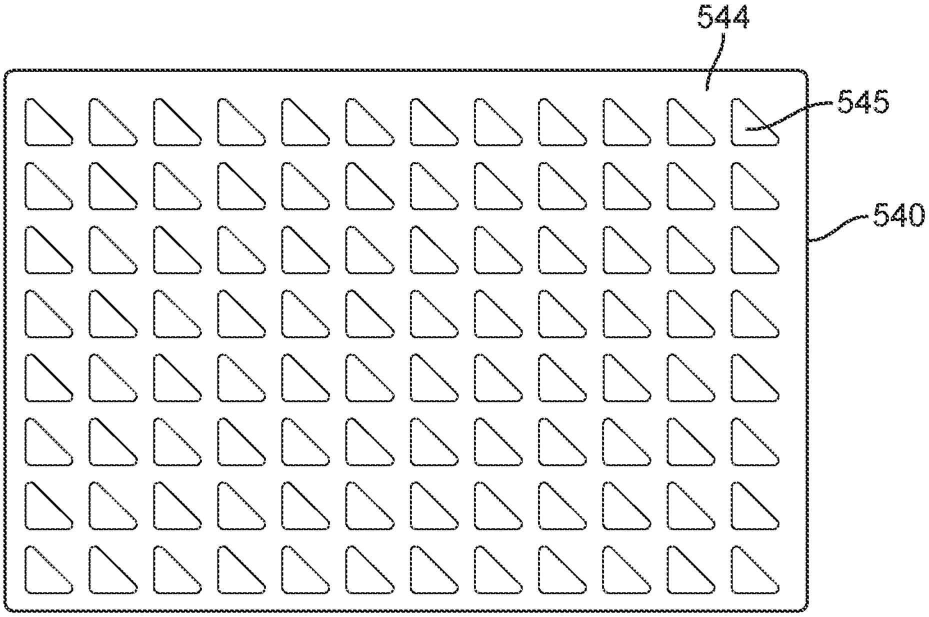
FIG. 17B is a top view thereof and FIG. 17C is a top perspective view thereof.
Figure 17C:
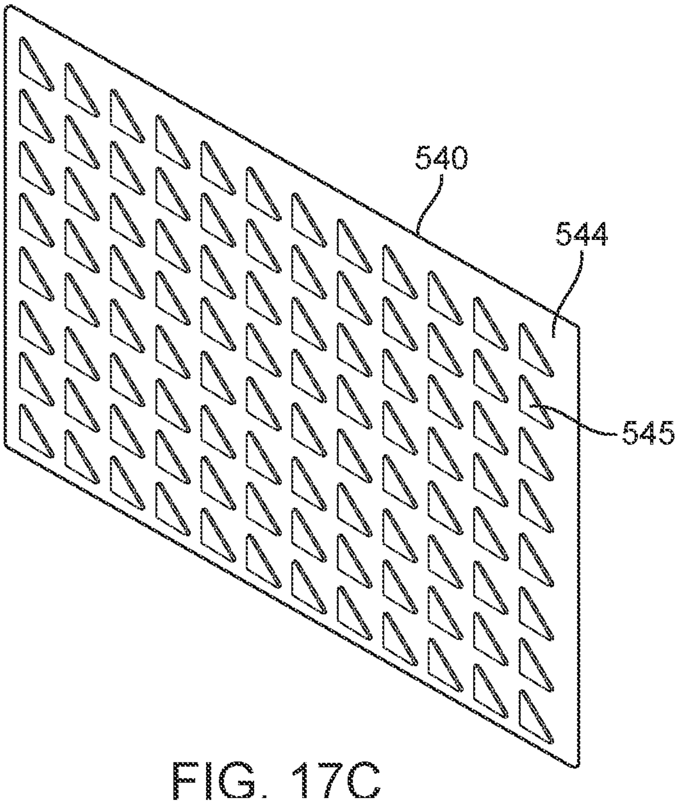
Figure 18B:
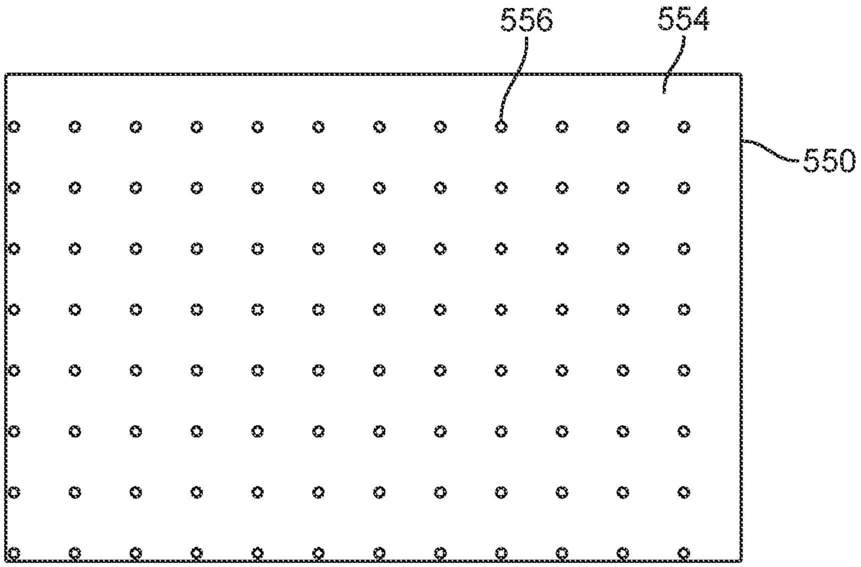
FIG. 18B is a bottom view thereof and FIG. 18C is a bottom perspective view thereof.
Figure 18A:
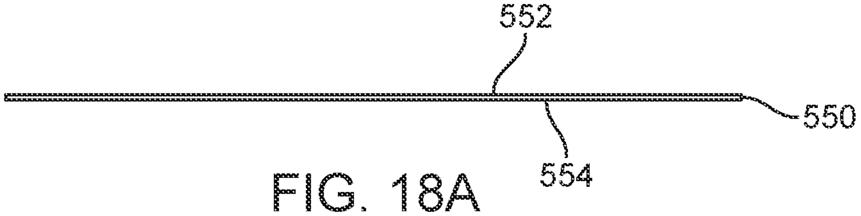
FIG. 18A is a side view of posterior member 550 of device 500.
Figure 18C:
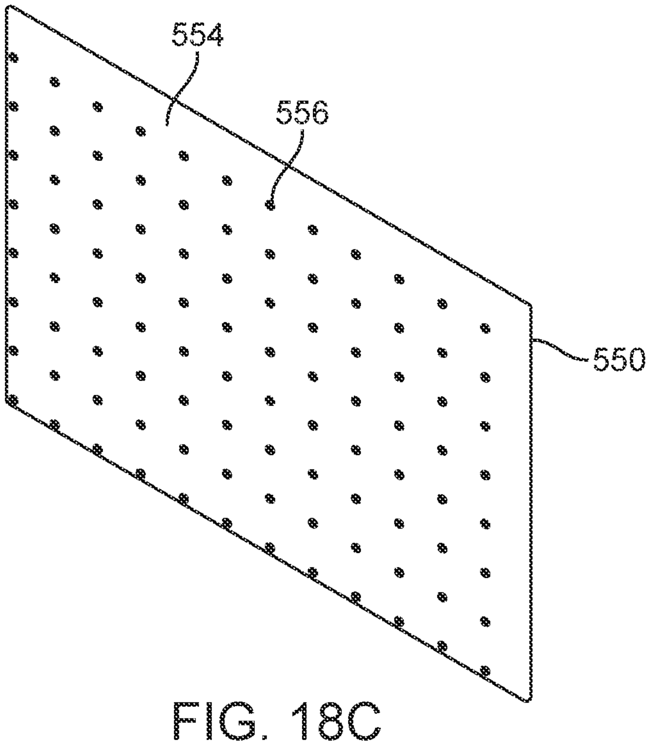

In each calibration unit 501 of device 500, first chamber 510 and second chamber 516 have a triangular lateral cross section, where each triangular section is a right triangle or substantially a right triangle. The hypotenuse of the triangular section of first chamber 510 opposes the hypotenuse of the triangular section of section chamber 516, thereby forming a compact calibration unit structure. A non-limiting example of this orientation of the first chamber and second chamber is illustrated in FIG. 16A and FIG. 16C, where first chamber 510 is disposed in an anterior position relative to channel 524. Opposing sidewalls of first chamber 510 and second chamber 516 are tapered, with the opposing sidewall of first chamber 510 tapering in the anterior-to-distal direction 599 and the opposing sidewall of the second chamber tapering in the posterior-to-anterior direction 598. The opposing sidewalls of the first chamber and second chamber can follow or substantially follow the same or similar draft angle. Such features of the first chamber and the second chamber contribute to a compact calibration unit structure.

Figure 13E:
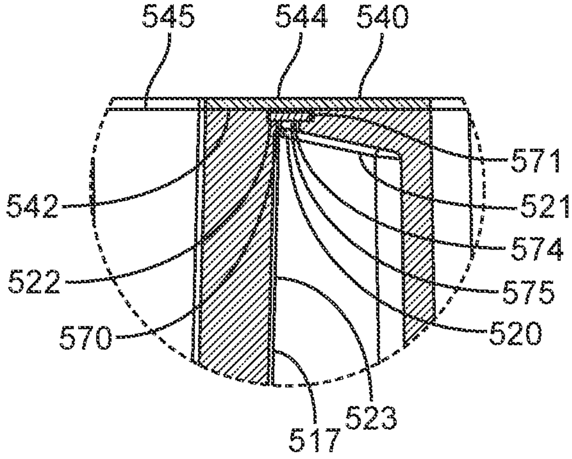

Device 500 includes hydrophobic membrane 522, which also is referred to as a “porous membrane,” in void-volume association with second chamber anterior opening 520'. Hydrophobic membrane 522 is in indirect void-volume association with second chamber anterior opening 520' via vent 575. Vent 575 is disposed between hydrophobic membrane 522 and second chamber anterior opening 520', and is disposed in an anterior position relative to opening 520'. Vent posterior terminus 577 is disposed at opening 520' of second chamber 516, and includes interior sidewall 578. Vent 575 is a void in substrate 502 and is a cylinder. Vent 575 is integrated with second chamber 516 and junction 570 and disposed in a posterior position in device 500 to junction 570. Junction 570 is a bore in substrate 502 at anterior surface 504 and includes relieved surface 573 and sidewall 571. Sidewall 571 includes opening 572. Sidewall 571 is perpendicular to anterior surface 504 of substrate 502, and the bore of junction 570 is cylindrical. The bore of junction 570 may be another geometry, such as a frustrum (e.g., conical frustrum), and the sidewall may taper in the anterior-to-posterior direction. Junction 570 contains hydrophobic membrane 522 and the depth of sidewall 571 often is the same or about the same as the depth of hydrophobic membrane 522. Relieved surface 573 of junction 570 includes opening 574 concentric with relieved surface 573 and vent 575. Vent anterior terminus 576 is disposed at opening 574 in relieved surface 572. A solid portion of posterior surface 542 of anterior member 540 disposed over junction 570 forms an internal anterior ceiling surface of junction 570 and captures hydrophobic membrane 522, as illustrated in FIG. 13E. Hydrophobic membrane 522 can be adhered to relieved surface 573 by an adhesive, heat staking or other bonding methodology. In an alternative implementation, hydrophobic membrane 522 may be disposed in a counterbore disposed in a posterior position relative to junction 570 and extending in the anterior-to-posterior direction from relieved surface 573. The counterbore may include a counterbore relieved surface disposed at the posterior terminus of the counterbore. The counterbore may be cylindrical or other geometry, such as a frustrum, for example, having sidewalls tapering in the anterior-to-posterior direction. A counterbore may retain a hydrophobic membrane by a compression fit.

Figure 11A:
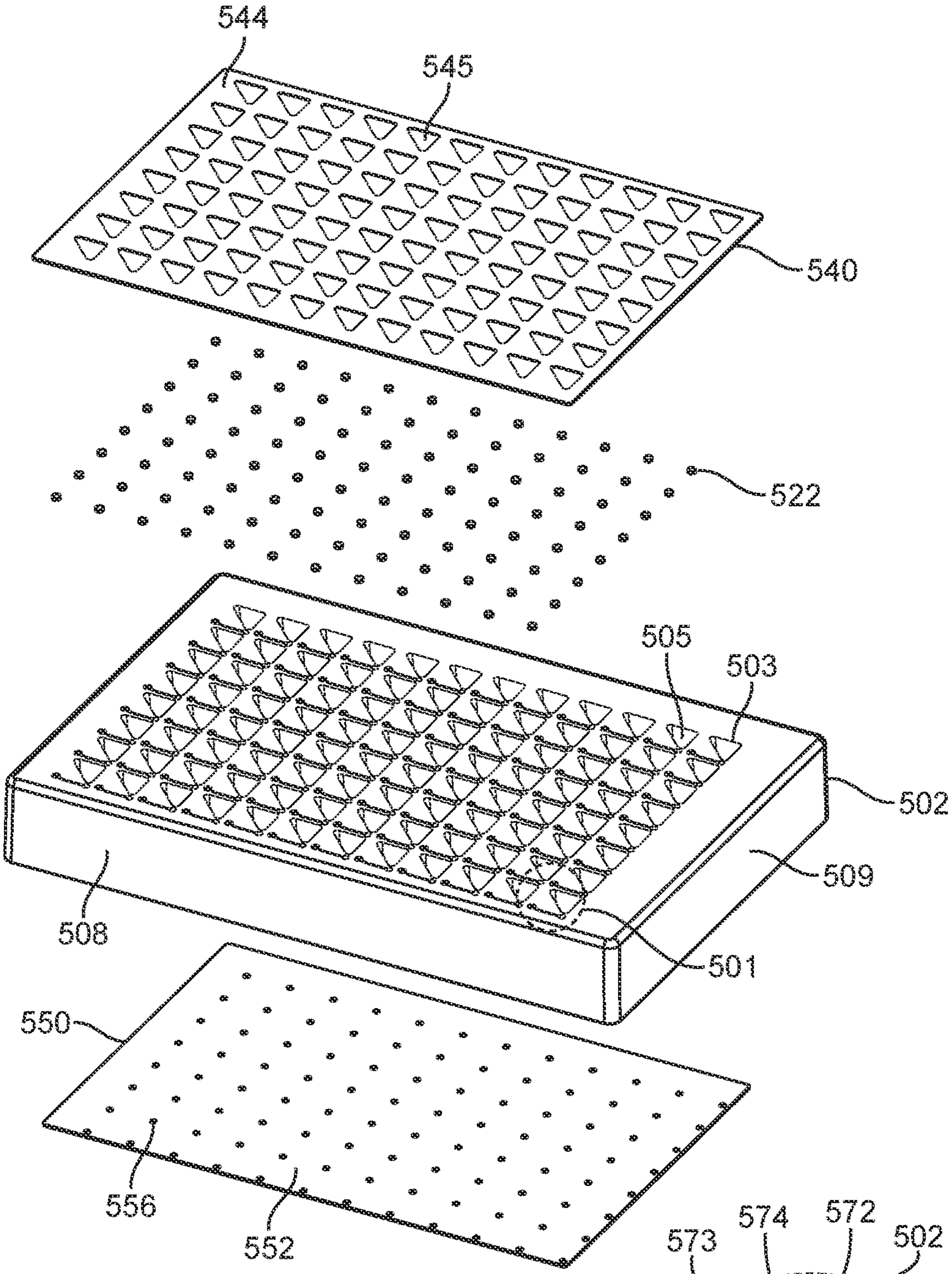
FIG. 11A is an exploded top perspective view of device 500 and FIG. 11B is an enlarged view of the portion in FIG. 11A defined by the broken circle.
Figure 11B:
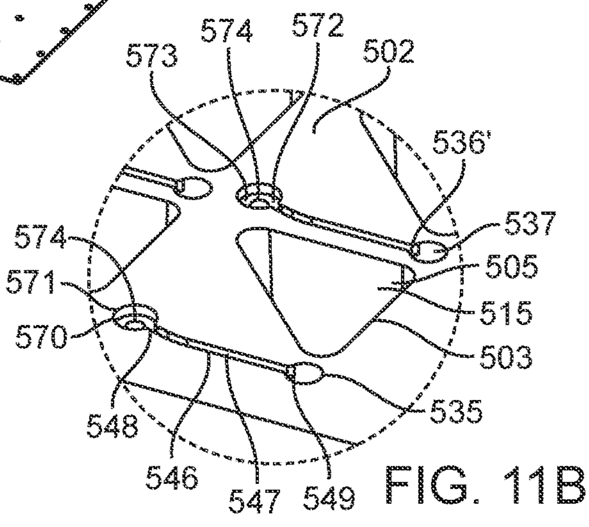

Hydrophobic membrane 522 disposed in an anterior portion of device 500 is in indirect void-volume association with an opening at the posterior surface of the device via a duct system. Device 500 includes lateral duct 546 disposed at junction 570. Lateral duct 546 is a groove disposed in substrate 502 at anterior surface 504 and contains sidewall 547, proximal terminus 548, and distal terminus 549, as illustrated in FIG. 11B, FIG. 15C and FIG. 16D. Lateral duct 546 has a rectangular cross section. Lateral duct 546 includes a curved portion in the proximal portion closer to junction 570 and a linear or substantially linear portion in the distal portion closer to axial duct 535. Proximal terminus 548 of lateral duct 546 is disposed at opening 572 in sidewall 571 of junction 570. A solid portion of posterior surface 542 of anterior member 540 disposed over lateral duct 546 forms an internal anterior surface of lateral duct 546, as illustrated in FIG. 14C.

Lateral duct 546 is connected to another duct, axial duct 535. Axial duct 535 is a void in substrate 502 and is defined in part by a bore extending from substrate anterior surface 504 to substrate posterior surface 506. Axial duct 535 includes sidewall 536, anterior terminus 537 disposed at substrate anterior surface 504 and posterior terminus 538 disposed at posterior member posterior surface 554. Axial duct 535 is a frustrum with sidewall 536 tapering in the anterior-to-posterior direction 599. Axial duct 535 includes anterior opening 536' disposed in sidewall 536 at anterior terminus 573 and distal terminus 549 of lateral duct 546 is disposed at anterior opening 536' of axial duct 535. A solid portion of posterior surface 542 of anterior member 540 disposed over the anterior opening of axial duct 535 in substrate anterior surface 504 forms an internal anterior ceiling surface of axial duct 535 at anterior terminus 537, as illustrated in FIG. 14C. Bore 556 of posterior member 550 is disposed at axial duct posterior terminus 538 in substrate posterior surface 506. Bore 556 is larger than the opening at axial duct posterior terminus 538 in substrate posterior surface 506, and a portion 539 of substrate posterior surface 506 surrounding the opening at axial duct posterior terminus 538 and bounded by the perimeter of bore 566 is exposed, as illustrated in FIG. 14C.

In device 500, a portion of substrate anterior surface 504 is bonded to posterior surface 542 (also referred to as a "bonded surface") of anterior member 540, forming junction 580 (also referred to as a "bond layer") between anterior member 540 and substrate 502. Anterior member 540 includes anterior surface 544 and bore 545 that in part defines first chamber anterior opening 512. A majority or all of substrate posterior surface 506 is bonded to anterior surface 552 (also referred to as "bonded surface") of posterior member 550, forming junction 582 (also referred to as a "bond layer") between posterior member 550 and substrate 502. Posterior member 550 includes posterior surface 554 and bore 556 adjacent to axial duct posterior terminus 538.

In device 500, substrate 502 includes exterior sidewalls having exterior surfaces 508 or 509 of adjacent exterior sidewalls and interior surfaces 587 and 588 on adjacent exterior sidewalls. Substrate 502 also includes interior sidewalls each opposing an adjacent exterior sidewall, and having surfaces 584 and 584 on adjacent interior sidewalls. Interior sidewalls are disposed in a posterior position relative to substrate anterior surface 504, each interior sidewall is offset from an exterior sidewall by inset surface 586, and each interior sidewall is offset from an exterior sidewall interior surface by a space or void. Interior wall surfaces in part define the perimeter of substrate posterior surface 506, which has a surface area less than the surface area of substrate anterior surface 504 due to the offset distance between exterior walls and interior walls.

Figure 10A:
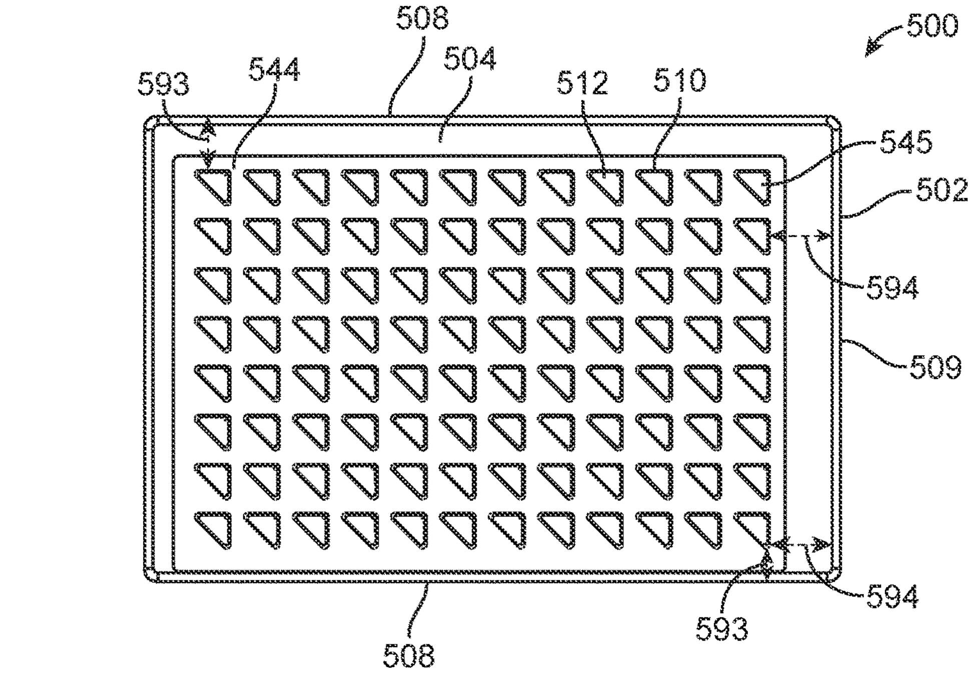
FIG. 10A is a top view of calibration device 500 containing an array of calibration units 501.
Figure 10B:
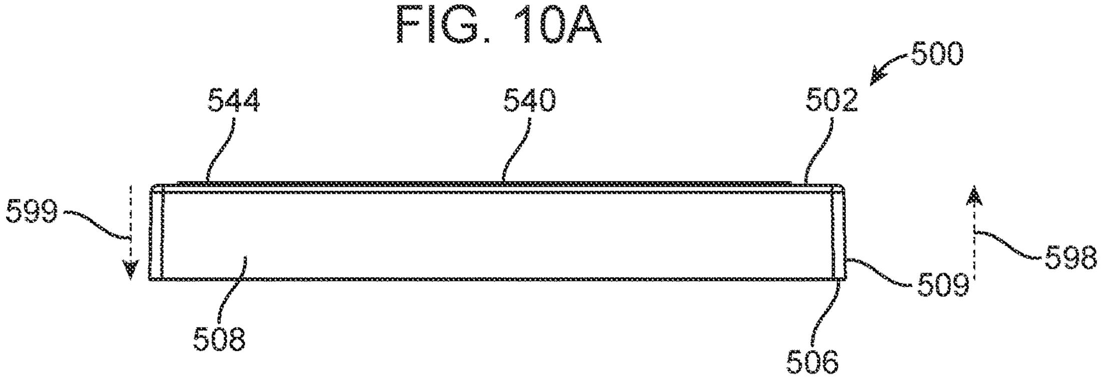
FIG. 10B is a side view thereof.
Figure 10C:
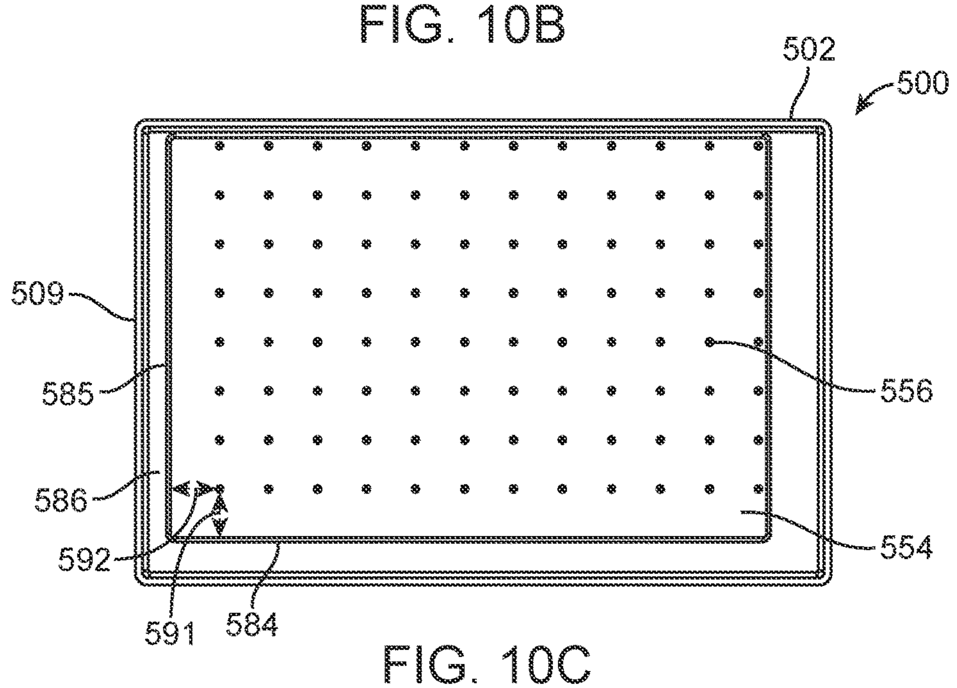
FIG. 10C is a bottom view thereof.
Figure 10D:
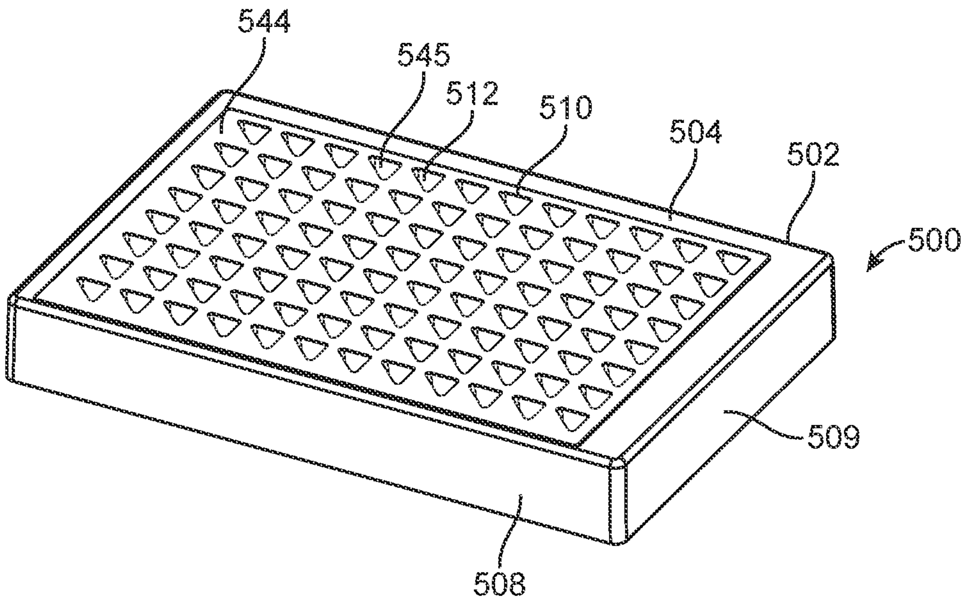
FIG. 10D is a top perspective view thereof.
Figure 10E:
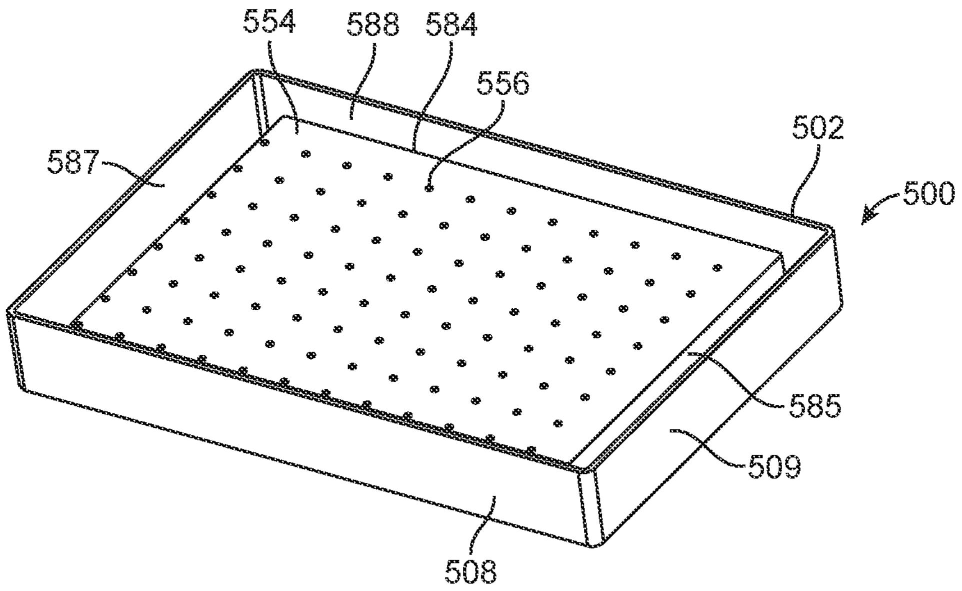
FIG. 10E is a bottom perspective view thereof.

Anterior member bore 545 in part defining first chamber anterior opening 512 in one calibration unit 501 has an offset distance from a substrate exterior sidewall different than an offset distance from an adjacent substrate exterior sidewall, and an array of anterior member bores may not be centered on substrate anterior surface 504 or on anterior member anterior surface 544. Offset distance 593 between substrate exterior surface 508 and anterior member bore 545, and offset distance 594 between substrate exterior surface 509 and anterior member bore 545, are different and are illustrated in FIG. 10A. Posterior member bore 556 in one calibration unit 501 may have an offset distance from a substrate interior sidewall different than an offset distance from an adjacent substrate interior sidewall, and an array of posterior member bores may not be centered on substrate posterior surface 506 or on posterior member posterior surface 554. Offset distance 591 between substrate interior surface 584 and posterior member bore 556, and offset distance 592 between substrate interior surface 585 and posterior member bore 556, are different and are illustrated in FIG. 10C.

Calibration device 500 can be joined to a device that applies a force motivating delivered fluid through cavities in the calibration device, such as a vacuum manifold 650 in assembly 600 for example. Vacuum manifold 650 includes anterior surface 652, relieved surface 660, interior cavity 670, and interior side surface 662. A posterior portion of calibration device 500, often including a continuous perimeter around a posterior portion of exterior sides 508 and 509, can be fitted onto relieved surface 660 of vacuum manifold 650, whereby interior side surface 662 contacts the continuous perimeter around a posterior portion of exterior sides 508 and 509 of calibration device 500. A gasket sometimes is disposed at relieved surface 660 and/or interior side surface 662 to facilitate a seal between calibration manifold 650 and calibration device 500. Vacuum manifold 650 can be connected to a vacuum (for example, applied by a vacuum generator) and includes vacuum connector 682, vacuum connector orifice 684, an optional pressure gauge 686, and vacuum connector linkage 688 that joins vacuum connector 682 to a sidewall of manifold 650.

Volume Calibration Device Manufacturing Methodology

A calibration device sometimes is manufactured by a process that includes preparing a posterior section by an injection molding process, embossing process (for example, hot embossing process) and/or die cutting process. In certain implementations, a calibration device is manufactured by a process that includes preparing an anterior section by an injection molding process, embossing process (for example, hot embossing process) and/or die cutting process. In certain instances, a calibration device is manufactured by a process that includes providing a posterior section and an anterior section and bonding the posterior section to the anterior section. In certain implementations, a calibration device is manufactured by a process that includes bonding a hydrophobic membrane to a posterior surface of a calibration device. A hydrophobic membrane can be bonded to a posterior surface of a calibration device after an anterior section is bonded to a posterior section, or before an anterior section is bonded to a posterior section. Any suitable bonding process may be employed, including a bonding process described herein.

In certain implementations, an anterior section, middle section and posterior section are manufactured and then bonded to one another to form a device in which the middle section is sandwiched between the anterior section and the posterior section. The anterior section can include a first chamber and optionally a well disposed in an anterior position relative to the first chamber posterior terminus (for example, the well and the first chamber posterior terminus are concentric). The middle section can be a film that has been cut (for example, by die or laser or other method) to form channels and optionally a well. The posterior section, which typically includes the second chamber and a hydrophobic membrane, can be bonded to the middle section before or after the middle section and anterior section are bonded. The sections often are registered with each other such that the first chamber and/or well of the anterior section are aligned with the proximal terminus of the channel, and the second chamber of the posterior section is aligned with the distal terminus of the channel. The sections can be bonded using any suitable bonding method as described herein.

In certain implementations, a substrate, anterior member and posterior member are provided and then bonded to form a device that includes the substrate disposed between the anterior member and posterior member. The anterior surface of the posterior member often is bonded to all or sometimes a portion of the posterior surface of the substrate. The posterior surface of the anterior member often is bonded to a portion or sometimes all of the anterior surface of the substrate. The substrate sometimes is injection molded. A substrate can contain bores that in part define a first chamber, second chamber, optional well, optional vent, optional axial duct, and/or an optional junction between the second chamber and/or optional vent and an optional lateral duct. A substrate sometimes includes one or more recesses and/or grooves that in part define a channel and optional lateral duct. An anterior member often includes bores that align with, and often are coextensive with, first chamber bore openings disposed at the anterior surface of the substrate. A solid portion at which a bore is not disposed in an anterior member can define an anterior surface of a lateral duct, can define an anterior surface of a junction, and/or can capture a hydrophobic membrane disposed in a junction. Prior to bonding an anterior member to a substrate, one or more hydrophobic membrane units may be joined to the substrate (for example, within a recessed surface (for example, at a junction) disposed on an anterior surface of the substrate) and optionally bonded (or not bonded for example) to the substrate. A posterior member often includes bores that align with (for example, coaxially aligned with) axial vent posterior openings. A solid portion at which a bore is not disposed in a posterior member can define a posterior terminus of an optional well, can define a posterior terminus of a first chamber, and/or can define a posterior surface of a channel. An anterior member and/or posterior member sometimes is a polymeric film in which bores are introduced by a suitable process, such as a punch process for example.

A section, substrate and/or member (a posterior member and/or anterior member, for example) of a device can be manufactured from a polymer. Non-limiting examples of polymers include polypropylene (PP), polyethylene (PE; high density PE, low density PE), polyethylene terephthalate (PET), polystyrene (PS), and the like.

A bonding process can be a solvent bonding process, laser bonding process (for example, interface laser bonding), adhesive bonding process (for example, pressure sensitive adhesive bonding), ultrasonic welding process and/or plasma bonding process. In a solvent bonding process, a solvent that dissolves a polymer from which the sections are made is applied to one or both of the surfaces to be bonded. While the surfaces are wet with solvent, the sections are pressed together with the wet surfaces in contact. Pressure is applied to keep the surfaces in close proximity and to ensure that the entire surface to be bonded is in contact. The solvent evaporates, and/or is absorbed into the bulk of the material. The polymer at the interface that was mildly dissolved by the solvent re-hardens and causes the adjacent surfaces to bond. Such a solvent bond typically is strong and water tight. Solvent strength and polymer type are selected to ensure that a sufficient bond is achieved between the layers.

In a laser welding process, a laser is used to heat and melt a polymer at the interface between the two sections. The material of the first section is selected to be transparent to the wavelength of light of the laser, and therefore transmit the laser energy without absorbing it. The polymer of the second section is selected such that it will absorb the laser light and heat until it is above its melting point. Through this process two materials can be bonded at the interface surface without substantially melting and distorting the surrounding material. In addition, the laser can be focused down to a fine pinpoint of light and programmed to selectively join the two surfaces in precisely controlled regions. In this way, the channel can be bonded on either side of the channel geometry forming a liquid tight seal at the edge of the channel.

In a pressure sensitive adhesive bonding process, sections of the device are bonded using a pressure sensitive adhesive designed to securely bond the sections while also providing a liquid-tight seal at the edges of the channel. A pressure sensitive adhesive may be cut (die or laser cut) to precisely control the regions of the adhesive.

Ultrasonic welding is a process in which high frequency vibrations are introduced into two (or more) polymer parts to be bonded. The vibrations cause relative motion between the parts, and in particular, at the interface in contact between the parts. The friction generated by the relative motion generates heat that melts the regions of the parts that are in contact. Once the ultrasonic energy is removed, the polymers re-solidify and become bonded together. Features such as weld beads and energy directors can be used to localize the heat and control exactly where the bonding occurs. Energy directors can be used to create a liquid tight seal along the edges of the channels of the device.

In a plasma bonding process, a plasma (for example, of oxygen) is used to modify the surface of one or both parts to be bonded. The plasma treatment causes the surfaces to become reactive so that when they are pressed into close proximity, the surfaces react with each other, bond tightly, and form a liquid tight junction.

A hydrophobic membrane can be bonded to a calibration device using any suitable bonding process. For example a hydrophobic membrane can be bonded at a region of a posterior surface of a calibration device over the posterior opening of a second chamber using a suitable bonding process. One approach is to apply a pressure sensitive adhesive to the membrane that adheres to the polymer of the calibration device. Another approach is to apply heat and pressure through an appropriately shaped heated element that melts the membrane and the calibration device surface, which bonds the membrane to the calibration device. Another bonding method is to apply ultrasonic energy to generate friction heat at the interface between the membrane and the calibration device section, which heat melts the materials of the membrane and calibration device together.

Dispenser Volume Calibration Methodology

In certain implementations, provided is a method for determining a fluid volume dispensed by a fluid dispenser device, the method including dispensing fluid from a fluid dispensing device into a first chamber of a volume calibration device containing no fluid, whereby the first chamber of the calibration device includes a dispensed fluid from the fluid dispenser device. Thereafter, the dispensed fluid often flows in the calibration device under the influence of a fluid-motivation force (for example, an applied fluid-motivation force), such as a pressure differential for example (for example, an applied vacuum). Fluid typically flows in a fluid path in the calibration device from the first chamber into a channel (for example, via an optional intermediary well), where the channel often includes a proximal terminus in fluid association with the first chamber (for example, the proximal terminus of the channel sometimes is disposed at a posterior terminus and/or side of the first chamber or an optional intermediary well). In the fluid path, fluid typically flows in the channel into a second chamber in fluid association with a distal terminus of the channel. Fluid often fills the second chamber and the proximal end of the fluid often transmits no further when it contacts a surface of a hydrophobic membrane. A second chamber often is in fluid association with a surface of a hydrophobic membrane (for example, via an optional intermediary vent). In certain instances, a posterior terminal opening or anterior terminal opening of the second chamber is in contact with the hydrophobic membrane surface. In certain implementations, a posterior terminal opening or anterior terminal opening of the second chamber contacts a vent terminus (for example, vent posterior terminal opening) and an opposing vent terminus (for example, vent anterior terminal opening) is in association or in contact with a hydrophobic membrane surface.

A fluid can be dispensed by a fluid dispenser into the first chamber of a calibration device in any suitable manner. A fluid dispenser device often is coupled to a pipette tip or probe, or plurality of pipette tips or probes, into which fluid is drawn and from which the drawn fluid is dispensed into a calibration device. A distal portion (for example, distal terminus) of a pipette tip or probe sometimes is positioned in proximity to the first chamber and/or sometimes is positioned in contact with an interior surface (sidewall for example) of the first chamber, as part of a process of dispensing fluid into the first chamber. An anterior opening of a first chamber may be slightly off center from a perfectly concentric alignment with a pipette tip or probe, such that the pipette tip or probe contacts a tapered interior sidewall surface of the first chamber. Such an orientation permits touch-off and permits the distal terminus of the pipette tip to be in close proximity to, or contact, an interior surface of the first chamber, increasing the probability that the dispensed fluid is completely transferred to the first chamber by minimizing or preventing droplets from being retained by the pipette tip or probe.

A pipette tip or probe containing fluid for dispensation into a first chamber often is lowered (or the calibration device is raised) until the pipette tip or probe is in proximity to or in contact with an interior sidewall of the first chamber. A liquid handler can be commanded to dispense the fluid at a certain speed that expels the fluid from the pipette tip or probe into the first chamber. The fluid dispensing event may be followed by a blow-out in which air is expelled from the pipette tip or probe to increase the probability of complete expulsion of fluid from the pipette tip or probe. The liquid handler then can retract the pipette tip or probe away from the first chamber.

Any fluid may be dispensed into a calibration device that is suitable for accurate and precise determination of fluid volume in the calibration device. A fluid can be selected that does not reside or does not substantially reside in the first chamber or a portion of a channel proximal to a dispensed fluid endpoint after fluid stops flowing in a calibration device. A dispensed fluid often has a high surface tension and often is hydrophilic, such as water or other aqueous solution, for example (for example, purified water, distilled water). High surface tension of a dispensed fluid facilitates preventing the dispensed fluid from penetrating and/or passing through a hydrophobic membrane disposed at the posterior opening of the second chamber. A dispensed fluid may contain one or more components suitable for determining the location of a dispensed fluid endpoint in a channel of a device (for example, a dye or other optically-detectable component). For implementations in which a hydrophilic fluid and/or fluid with a high surface tension is dispensed, walls of one or more voids and/or cavities of a calibration device (for example, first chamber, second chamber, channel, optional well, optional vent) sometimes are hydrophobic (for example, contain a hydrophobic coating and/or are manufactured from a hydrophobic material).

Dispensed fluid often flows in a channel under a motivation force, which often is an applied motivation force (for example, applied by a user of a calibration device). A motivation force sometimes is a pressure differential between the first chamber and the second chamber. A pressure differential between the first chamber and the second chamber can be applied in any manner suitable for motivating flow of fluid dispensed in the first chamber through the channel into the second chamber. In certain instances, a pressure differential is established by applying a vacuum to the second chamber. In certain implementations, a vacuum is applied at the exterior side (i.e., posterior side) of the hydrophobic membrane. The hydrophobic membrane can retain or substantially retain fluid in the device, and can block fluid or substantially block fluid from exiting the device.

A vacuum can be applied at the hydrophobic membrane by joining a calibration device to a vacuum device (for example, a vacuum manifold) designed to sealingly join with the calibration device. A calibration device sometimes includes a SBS standard footprint and can be joined to a vacuum manifold designed for use with SBS standard footprint microplates (for example, a commercially available manifold for use with filter-bottom microplates). A manifold sometimes includes a gasket that is designed to seal to the perimeter of a posterior portion of a calibration device after a vacuum is applied. A calibration device sometimes includes a seal member, such as a continuous rib surrounding a perimeter of a posterior portion of the calibration device that facilitates seal integrity, for example. A each calibration unit of a calibration device often is within the perimeter of the posterior surface of the calibration device, and thereby exposed to the vacuum of the vacuum device. A first chamber, which typically is disposed in an anterior portion of a calibration device, often is exposed to atmospheric pressure. After a vacuum is applied to a posterior portion of a calibration device by a vacuum device, a pressure differential can be generated between the fluid path proximal initiation location (for example, a first chamber) to the fluid path distal terminus (for example, a hydrophobic membrane surface), which drives dispensed fluid within the calibration device to the distal fluid endpoint (for example, a hydrophobic membrane surface). A pressure differential often is generated between an anterior portion (for example, a first chamber) and a posterior portion of a calibration device (for example, a hydrophobic membrane disposed on a device posterior surface; a duct posterior opening and/or posterior member bore disposed at or adjacent to a device posterior surface).

As an alterative to applying a vacuum after fluid is dispensed into a calibration device, a calibration device may be provided in which a fluid path in the device is under a negative pressure (for example, a pressure lower than atmospheric pressure). Such a device can include seal (for example, a breakable seal) disposed at each void opening that maintains the negative pressure within internal voids of the device. A seal sometimes covers the anterior opening of the first chamber, and may include a seal covering a posterior opening of the device. A hydrophobic membrane of a device may serve as a seal. In use, a fluid dispenser member (for example, pipette tip, probe) can break the seal at the anterior opening of the first chamber and the broken seal can seal around the fluid dispenser member. Fluid then can be dispensed into the first chamber and a pressure differential between the fluid dispenser member (for example, sometimes at atmospheric pressure) and the internal fluid path in the calibration device (for example, sometimes at a pressure below atmospheric pressure) motivates the dispensed fluid within the fluid path in the calibration device.

A pressure differential sometimes is about 10% to about 90% of atmospheric pressure (about 14.7 pounds per square inch (psi)), and may be about 20%, 30%, 40%, 50%, 60%, 70% or 80% of atmospheric pressure. A pressure differential can in part determine the velocity at which a dispensed fluid flows through the fluid path of a calibration device (for example, from a first chamber to an optional well to a channel to a second chamber to an optional vent and to a hydrophobic membrane), and different calibration devices may be operated at a different optimum pressure differential.

Dispensed fluid flowing in a fluid path of a device often fills the second chamber. After dispensed fluid stops flowing in the calibration device, fluid in the device often has filled the entire volume or substantially the entire volume of the second chamber, and often fills a portion of the channel to a fluid endpoint between the channel proximal terminus and the channel distal terminus. For a device containing an optional vent between the second chamber and hydrophobic membrane, the entire volume or substantially the entire volume of the vent also typically fills with dispensed fluid. After dispensed fluid stops flowing in the device, the dispensed fluid often is a continuous fluid volume (for example, slug) from the hydrophobic membrane surface, through the distal terminus of the channel and to the fluid endpoint at a position in the channel between the channel distal terminus and the channel proximal terminus. The continuous fluid volume (for example, slug) often contains no, or substantially no, detectable bubbles (for example, air bubbles). After dispensed fluid stops flowing in the device, the portion of the channel proximal to the fluid endpoint, and the first chamber and optional well, often include no, or substantially no, detectable sample fluid.

A volume determination method often includes determining the position (i.e., location) of the fluid endpoint in the channel. The proximal fluid endpoint typically is in the channel between the proximal channel terminus and the distal channel terminus, and the distal fluid endpoint typically is at a hydrophobic membrane surface. The location of the proximal fluid endpoint in the channel typically is determined after fluid stops flowing in the device and the proximal fluid endpoint in the channel is in a fixed position. A user can determine when the fluid stops flowing in the device by any suitable technique, including without limitation: (i) waiting a predetermined amount of time between dispensing fluid from a dispenser into the first chamber to determining the position of the fluid endpoint in the channel, and/or (ii) determining the fluid endpoint at several points in time and determining that the fluid endpoint has not changed in at least two determinations.

The location of a fluid endpoint in the channel can be determined using an optical detector. In certain implementations, an image of the channel containing a fluid sample is obtained and computer software is used to determine the position of the fluid endpoint in the channel. Such software can analyze pixels of the image and identify a difference between a fluid-filled region (region of a channel distally-disposed to the dispensed fluid endpoint) and a region not containing fluid (region of a channel proximally-disposed to the dispensed fluid endpoint). There are several manners in which contrast between the fluid-filled and non-fluid-filled regions of the channel can be enhanced, such as, for example, (i) inclusion of a detectable component (for example, dye) in dispensed fluid, (ii) providing a clear foreground layer and a translucent or opaque background layer (for example, white, or other light color, background), (iii) backlighting of translucent or transparent layers, and/or (iv) inclusion of molded features in a channel. Molded features in a channel can include (i) frosting for which a portion of a channel containing fluid is optically distinguished from a portion of a channel not containing fluid, and/or (ii) registration marks, which can appear or disappear depending on the presence or absence of fluid. Registration marks can be included on an exterior surface or interior surface (for example, on a channel surface) of a calibration device.

A volume of the dispensed fluid in the calibration device can be determined from the location of the dispensed fluid endpoint in the channel. After dispensed fluid stops flowing in the device, the dispensed fluid typically fills the entire volume of the second chamber and optional vent or substantially the entire volume of the second chamber and optional vent. The volume of the dispensed fluid from the distal fluid endpoint (for example, at a hydrophobic membrane surface) to the channel distal terminus, is known and/or can be determined as known in the art. The volume of the dispensed fluid contained in the portion of the channel between the channel distal terminus and the fluid endpoint between the channel distal terminus and channel proximal terminus, after fluid stops flowing in the device, can be determined by a method known in the art. The volume of the dispensed fluid can be determined from the channel geometry, second chamber geometry, optional vent geometry, and geometry of any other applicable component (for example, posterior member geometry), and the precise location of the dispensed fluid endpoint in the channel.

In certain implementations, the length of the channel containing fluid (i.e., from the distal terminus of the channel to the dispensed fluid endpoint in the channel) is determined and the volume of sample in the channel containing fluid can be calculated based on a known channel cross-sectional area of the channel. The cross section does not need to be constant across the entire channel length, and the sample fluid volume can be calculated in part from a known cross-sectional area for the channel length measured. Fluid volume in certain instances is calculated using a computer aided design (CAD) model of the channel and other applicable structures (for example, second chamber, optional vent and any other structure that will contain a fluid volume after fluid flows through the device). In certain implementations, a dispensed fluid volume is determined (calibrated) empirically by filling the fluid path cavity (i.e., second chamber and portion of the channel) with known volumes of liquid and making measurements of the dispensed fluid endpoint location over the length of the channel or portion thereof. The hydrophobic membrane can serve as a known starting point in the cavity volume, simplifying the measurement process to one required dimension. The hydrophobic membrane typically positions the dispensed fluid in a known region of the cavity.

Figure 6:
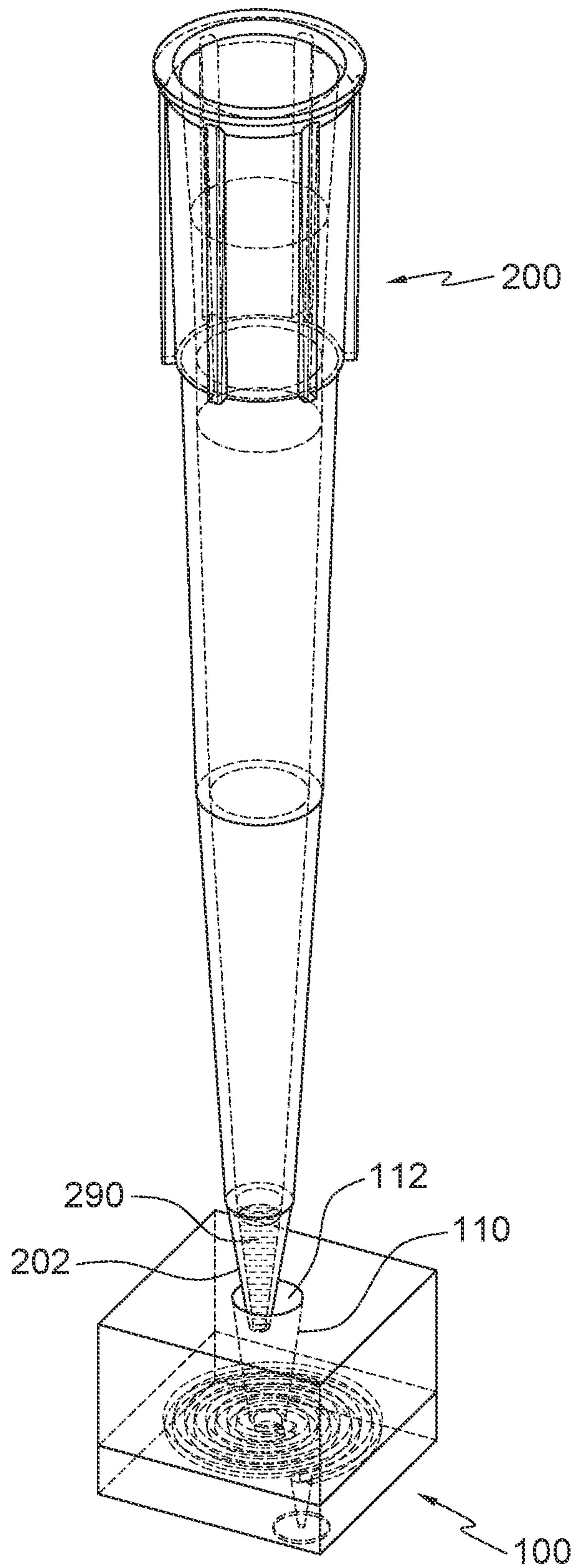

In a particular implementation, a fluid volume determination method can be implemented as illustrated in FIG. 6 to FIG. 8D. Distal portion 202 of pipette tip 200 connected to a fluid dispensing device (also referred to as a "liquid handling apparatus") can be inserted through opening 112 into first chamber 110 of calibration device 100, as illustrated in FIG. 6, for example. While a pipette tip can dispense fluid into device 100, a dispensing device may dispense fluid into device 100 via a probe, needle or other dispensing structure. Calibration device 100 contains no fluid 290 in pipette tip 200 at this point of the method.

Figure 7:
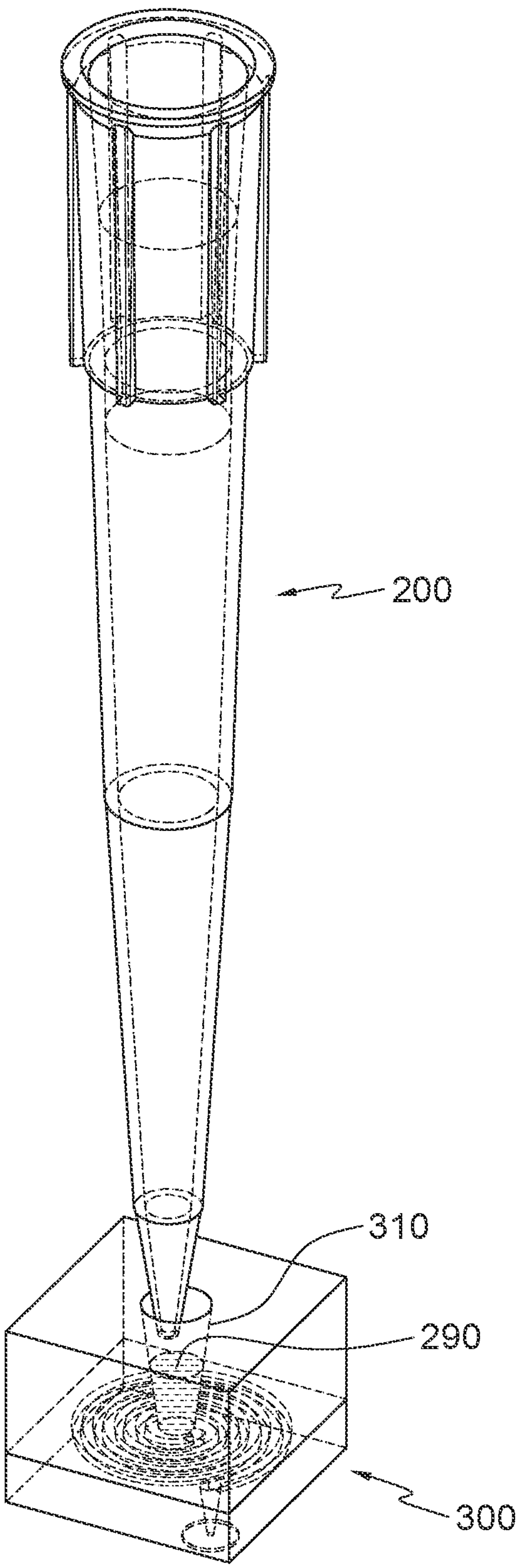
Figure 8A:
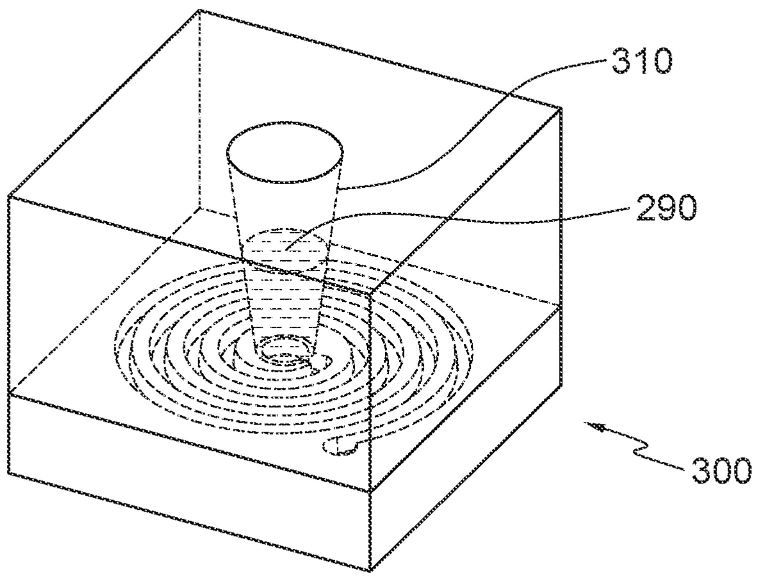
FIG. 8A is a top perspective view of device 300 containing dispensed fluid 290 after the pipette tip has been disassociated and before a pressure differential is introduced to device 300.

The fluid dispenser then dispenses fluid 290 (also referred to as "liquid sample") into device 100. Device 300 includes the same structural features as device 100 except that device 300 includes dispensed fluid 290 and device 100 does not include dispensed fluid. As illustrated in FIG. 7, fluid 290 dispensed from pipette tip 200 is in first chamber 310 of device 300. Dispensed fluid 290 typically fills a portion of first chamber 310 and sometimes fills well 330 at this point of the method, as illustrated in FIG. 8A.

Figure 8B:
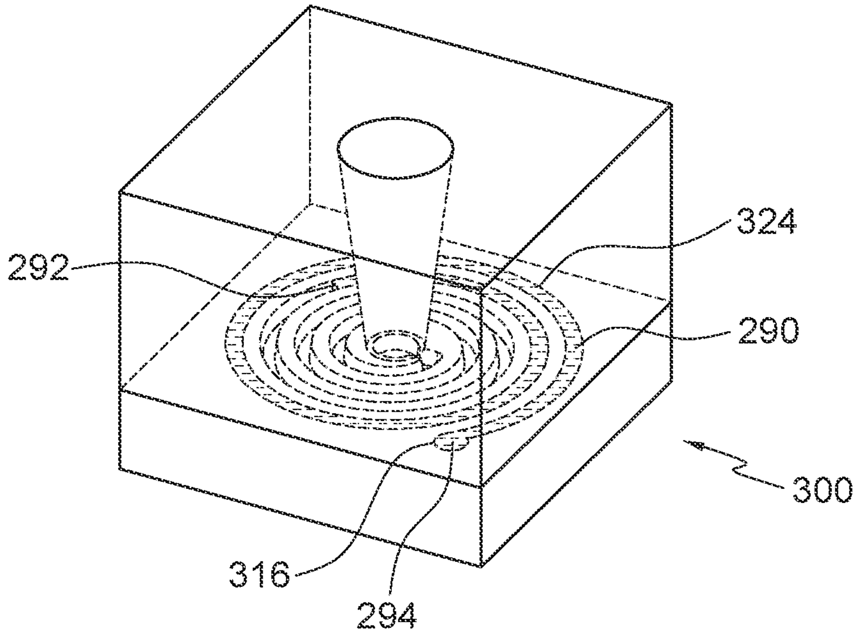
FIG. 8B is a top perspective view of device 300, illustrating dispensed fluid 290 having flowed in a fluid path in device 300 after a pressure differential has been applied.
Figure 8C:
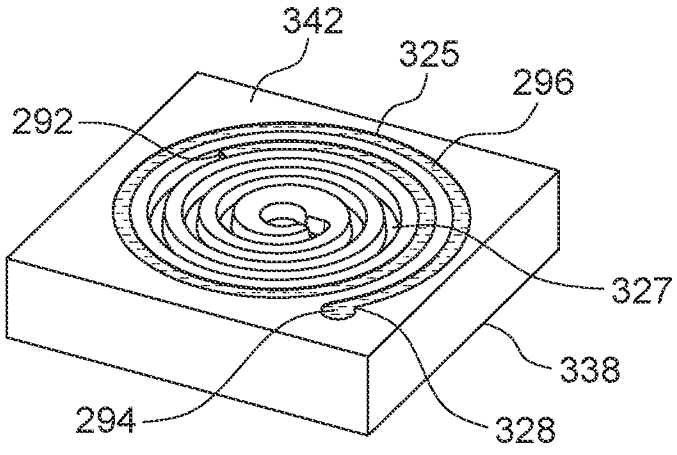
FIG. 8C is a top perspective view, and a partial exploded view, of the device 300 shown in FIG. 8B, illustrating posterior section 338 containing a portion of the fluid path containing dispensed fluid 290 and a portion of the fluid path containing no dispensed fluid.
Figure 8D:
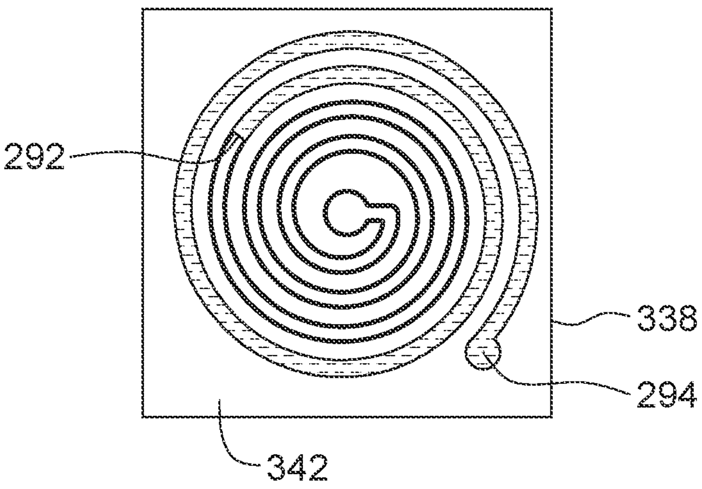
Figure 9A:
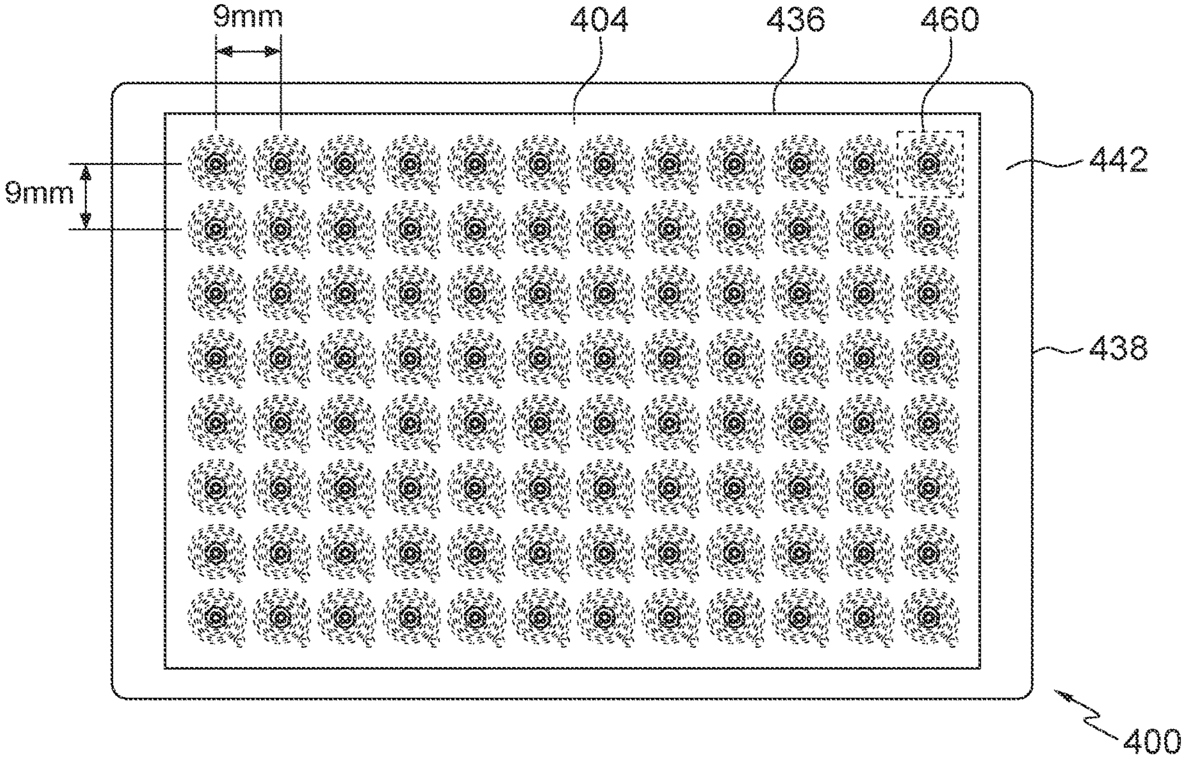
FIG. 9A is a top view of volume calibration device 400 containing an array of calibration units 460.
Figure 9B:
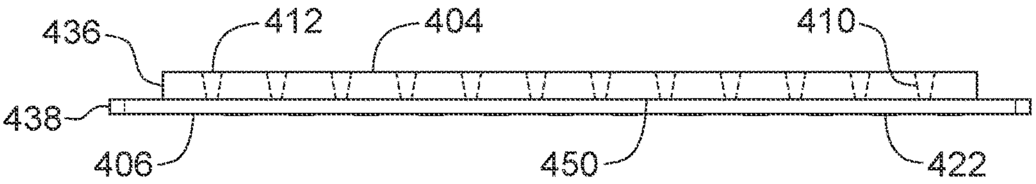
FIG. 9B is a side view thereof.
Figure 9C:
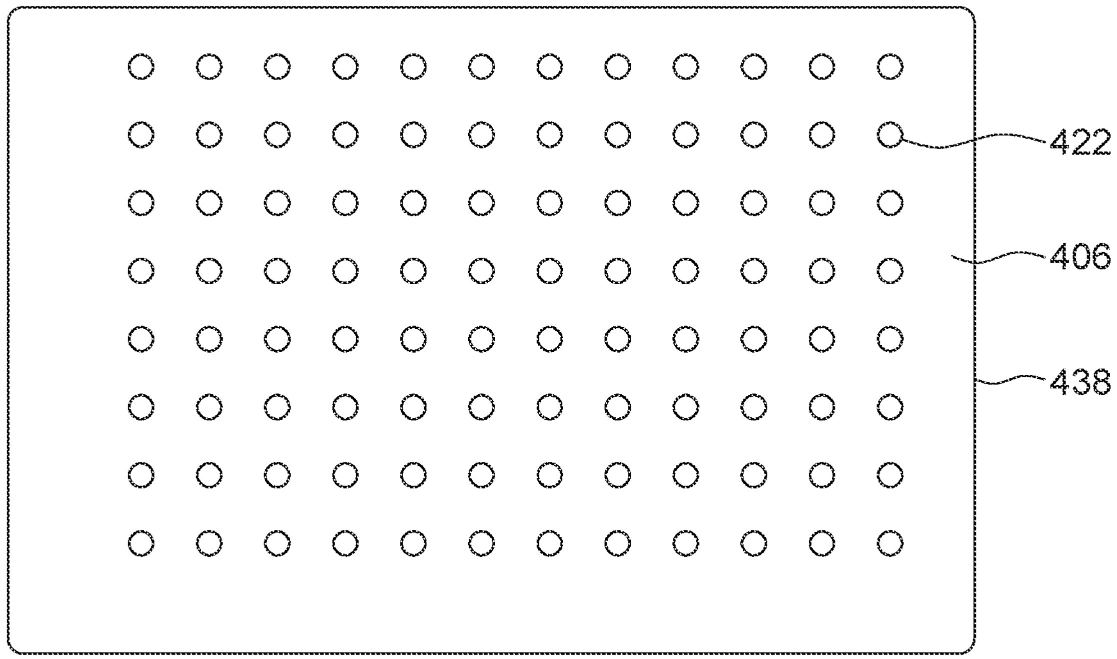
FIG. 9C is a bottom view thereof.
Figure 9D:
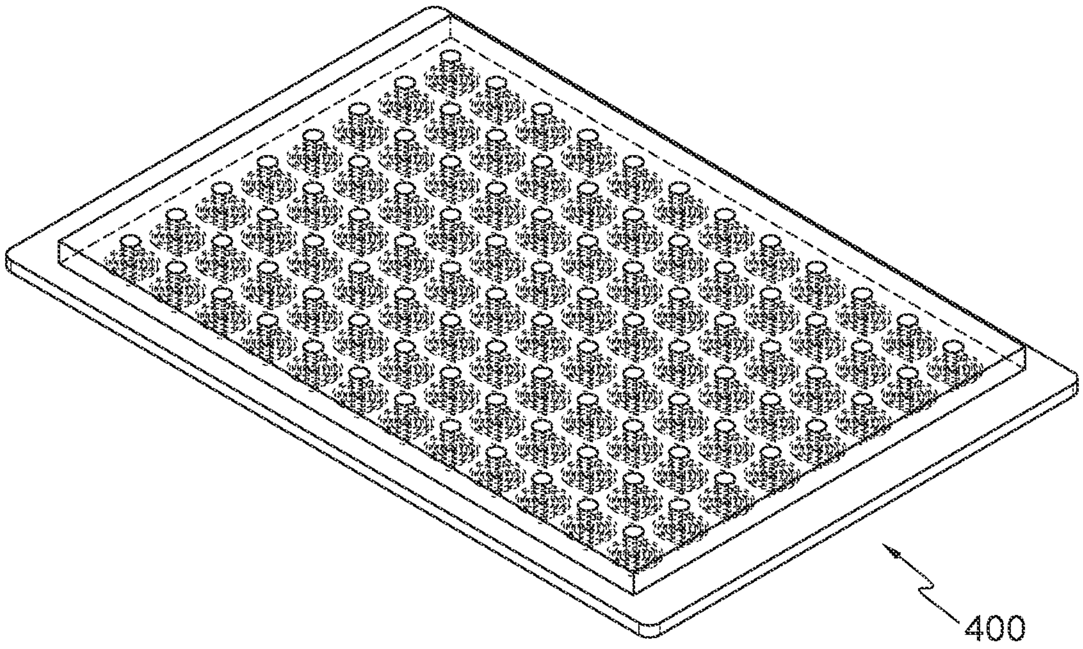
FIG. 9D is a perspective view thereof.
Figure 9E:
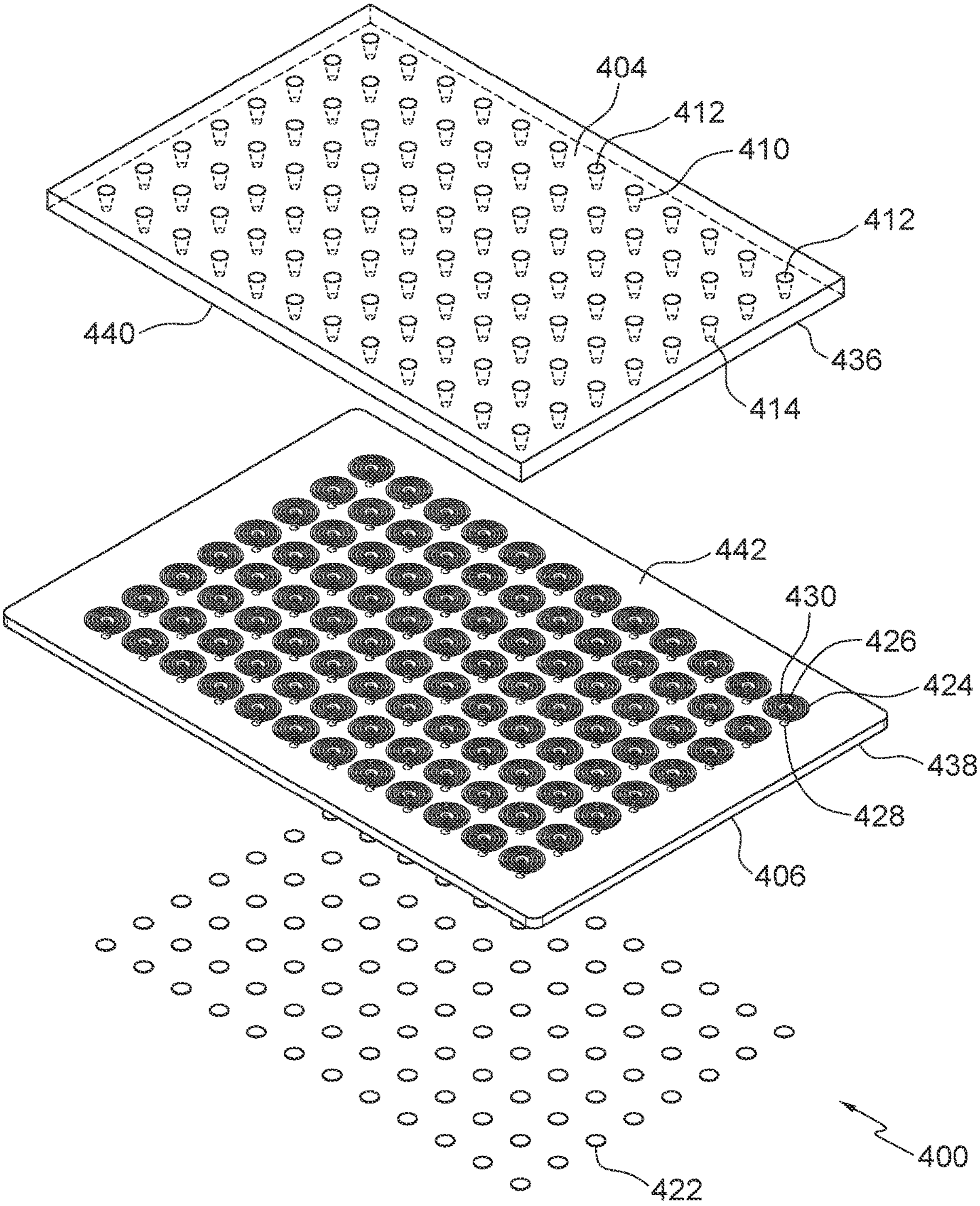
FIG. 9E is an exploded and enlarged view thereof.

A pressure differential between first chamber 310 and second chamber 316 motivates dispensed fluid to flow from first chamber 310 through well 330 into channel 324 and into second chamber 316. A pressure differential can be applied to device 300 by contacting posterior surface 306, at the second chamber posterior opening 318 and at hydrophobic membrane 322, with a device that provides a vacuum, or otherwise generates a pressure differential between first chamber 310 and second chamber 316, as illustrated in FIG. 8A. Hydrophobic membrane 322 retains fluid in second chamber 316 by not permitting fluid to flow out of second chamber posterior terminus 318 from device 300. As a result, first chamber 310 typically empties of dispensed fluid 290, second chamber 316 fills with a portion 294 of dispensed fluid 290, and a portion 296 of dispensed fluid 290 forms a continuous fluid path from the distal terminus 328 of channel 324 at second chamber 316 to dispensed fluid endpoint 292 in channel 324, as illustrated in FIG. 8B. Portion 296 of dispensed fluid 290 in channel 324 fills distal portion 325 of channel 324 between distal terminus 328 of channel 324 to dispensed fluid endpoint 292, resulting in proximal portion 327 of channel 324 containing no, or substantially no, dispensed fluid 290, as illustrated in FIG. 8C and FIG. 8D.

The volume of portion 294 of dispensed fluid 290 filling or substantially filling second chamber 316 is equal to or substantially equal to the volume of second chamber 316. The volume of portion 296 of dispensed fluid 290 from distal terminus 328 of channel 324 to fluid endpoint 292 in channel 324 is determined by the location of endpoint 292 in channel 324. The total volume of dispensed fluid 290 in device 300 equals or substantially equals the volume of portion 294 and portion 296.

In certain implementations, a fluid dispensing device is a multichannel dispensing device including a plurality of dispenser units arranged in series and/or in an array (for example, device 400 illustrated in FIG. 9A to FIG. 9E). A calibration device that receives dispensed fluid from the dispensing device often includes calibration units arranged in a counterpart series and/or array, in which each of the calibration units in the calibration device receives a dispensed fluid volume from one of the dispenser units in one dispensing event. In certain implementations, a calibration device includes the same, greater or fewer number of calibration units as dispenser units of the dispensing device. In certain instances, a dispensed volume from each dispenser unit is determined for one dispensing event. In certain instances, dispensed volume from each dispenser unit is determined in each of multiple dispensing events.

In a particular implementation, a fluid volume determination method can be implemented by utilizing calibration device 500. Distal portion 202 of pipette tip 200 connected to a fluid dispensing device can be inserted through first chamber anterior opening 512 into first chamber 510 of calibration device 500, for example. While a pipette tip can dispense fluid into device 500, a dispensing device may dispense fluid into device 500 via a probe, needle or other dispensing structure. In certain implementations, a fluid dispensing device is a multichannel dispensing device including a plurality of dispenser units arranged in series and/or in an array, where each dispenser unit is paired to a counterpart first chamber 510 in a calibration unit 510 of device 500. The fluid dispenser can then dispense fluid 290 into device 500. Fluid 290 dispensed from pipette tip 200 is in first chamber 510 of device 500. Dispensed fluid 290 typically fills a portion of first chamber 510 and sometimes fills well 530.

A motivation force then can be applied to device 500 that motivates fluid from first chamber 510 through voids to hydrophobic membrane 522 in each calibration unit 501. A pressure differential between first chamber 510 and hydrophobic membrane 522 can be applied by introducing a vacuum to device 500. A pressure differential can be applied by a introducing a vacuum to device 500 introduced by vacuum manifold 650. Device 500 can be joined to vacuum manifold 650 before or after fluid is dispensed into first chamber 510. Application of a pressure differential can motivate dispensed fluid to flow from first chamber 510 through well 530 through channel 524, through second chamber 516 and into vent 575. Hydrophobic membrane 522 retains fluid in vent 575 by serving as a barrier to fluid to flow. As a result, first chamber 510, well 530 and a proximal portion of channel 524 typically empty of dispensed fluid, and dispensed fluid typically fills and is disposed in a portion of channel 524, second chamber 516 and vent 575 in a continuous fluid path from a proximal fluid endpoint in channel 524 to a distal fluid endpoint at hydrophobic membrane 522. The volume of dispensed fluid in the continuous fluid path then can be determined from the proximal fluid endpoint as described herein.

EXEMPLARY IMPLEMENTATIONS

Following are non-limiting examples of certain, exemplary implementations of the technology as provided herein:

A0.1. A fluid dispenser volume calibration device, comprising:

an anterior surface, a posterior surface, a side surface, first chamber, second chamber hydrophobic membrane and channel, wherein:

the first chamber comprises an anterior opening disposed at the anterior surface of the device and a posterior terminus;

the second chamber comprises a posterior terminus, a sidewall and an anterior terminus;

the hydrophobic membrane is in fluid connection with the second chamber; and the channel comprises a proximal terminus in fluid connection with the first chamber and a distal terminus in fluid connection with the second chamber.

A0.2. The device of embodiment A0.1, comprising a well, wherein:

the first chamber comprises a posterior port disposed at the first chamber posterior terminus;

the well comprises a well anterior terminus, a well sidewall and a well posterior terminus;

the well anterior terminus is disposed at the first chamber posterior port;

the well comprises a well posterior port disposed at the well posterior terminus and the well sidewall; and the channel proximal terminus is disposed at the well posterior port.

A0.3. The device of embodiment A0.1 or A0.2, wherein:

the second chamber comprises an anterior port disposed at the second chamber anterior terminus and a posterior port disposed at the second chamber posterior terminus and second chamber sidewall; and the channel distal terminus is disposed at the second chamber posterior port.

A0.4. The device of embodiment A0.3, comprising a vent, wherein:

the vent comprises a vent anterior terminus, a vent sidewall and vent posterior terminus; and the vent posterior terminus is disposed at the second chamber anterior port.

A0.5. The device of any one of embodiments A0.1-A0.4, comprising a substrate, wherein:

the substrate comprises an anterior surface and a posterior surface;

the substrate optionally comprises a recess;

the recess optionally is disposed at the substrate anterior surface;

the optional recess comprises a recessed surface and a recess sidewall; and the recessed surface optionally comprises a recessed surface port.

A0.6. The device of embodiment A0.5, wherein the vent anterior terminus is disposed at the recessed surface port.

A0.7. The device of embodiment A0.5 or A0.6, wherein the recess comprises a recess sidewall port disposed in the recess sidewall.

A0.8. The device of any one of embodiments A0.5-A0.7, wherein the hydrophobic membrane is disposed in the recess.

A0.9. The device of any one of embodiments A0.5-A0.7, comprising a duct, wherein the duct comprises a duct terminus in void-volume association with the hydrophobic membrane.

A0.9.1. The device of embodiment A0.9, wherein the duct terminus is disposed at the hydrophobic membrane, or is disposed at the recess, or is disposed at the recess sidewall port.

A0.10. The device of embodiment A0.9, comprising a lateral duct, wherein:

the lateral duct comprises a lateral duct proximal terminus, a lateral duct distal terminus and a lateral duct sidewall; and the lateral duct proximal terminus is disposed at the recess sidewall port.

A0.11. The device of embodiment A0.10, comprising an axial duct, wherein:

the axial duct comprises an axial duct anterior terminus, an axial duct posterior terminus, an axial duct sidewall, and an axial duct anterior port disposed in the axial duct sidewall at the axial duct anterior terminus; and the axial duct posterior terminus is disposed at the substrate posterior surface.

A0.12. The device of any one of embodiments A0.1-A0.12, comprising an anterior member, wherein:

the anterior member comprises an anterior surface, a posterior surface and an anterior member bore;

the posterior surface of the anterior member is bonded to at least a portion of the substrate anterior surface; and the substrate comprises a first chamber bore comprising a bore anterior opening disposed at the substrate anterior surface;

the anterior member bore is aligned and coextensive with the first chamber anterior bore of the substrate and is the first chamber anterior opening of the device.

A0.13. The device of embodiment A0.12, wherein the anterior member comprises a solid portion covering the recess and hydrophobic membrane disposed in the recess.

A0.14. The device of embodiment A0.12 or A0.13, wherein the anterior member comprises a solid portion covering the lateral duct and the posterior surface of the anterior member at the portion is a lateral duct ceiling surface.

A0.15. The device of any one of embodiments A0.12-A0.14, wherein the anterior member comprises a solid portion covering the axial duct anterior terminus and the posterior surface of the anterior member at the portion is an axial duct ceiling surface.

A0.16. The device of any one of embodiments A0.1-A0.15, comprising a posterior member, wherein:

the posterior member comprises an anterior surface, posterior surface and posterior member bore;

the anterior surface of the posterior member is bonded to at least a portion of the substrate posterior surface; and the posterior member bore is coaxially and/or concentrically disposed at the axial duct posterior terminus.

A0.17. The device of embodiment A0.16, wherein the posterior member comprises a solid portion disposed at the channel and the anterior surface of the posterior member at the portion is a channel floor.

A0.18. The device of embodiment A0.16 or A0.17, wherein the posterior member comprises a solid portion disposed at the second chamber posterior terminus and the anterior surface of the posterior member at the portion is a second chamber floor.

A0.19. The device of any one of embodiments A0.16-A0.18, wherein the posterior member comprises a solid portion disposed at the well posterior terminus and the anterior surface of the posterior member at the portion is a well floor.

A0.20. The device of any one of embodiments A0.1-A0.19, comprising at least one calibration unit.

A0.21. The device of embodiment A0.20, wherein each calibration unit comprises the first chamber, the second chamber, the channel and hydrophobic membrane.

A0.22. The device of embodiment A0.21, wherein each calibration unit comprises the well, the vent, the recess, the lateral duct and the axial duct.

A0.23. The device of any one of embodiments A0.20-A0.22, comprising two or more units arranged in an array.

A0.24. The device of any one of embodiments A0.1-A0.23, wherein the channel comprises an interior surface and at a least portion of the interior surface of the channel is hydrophobic.

A0.25. The device of embodiment A0.24, wherein at least a portion of the interior surface of the channel comprises a coating comprising a hydrophobic material.

A0.26. The device of any one of embodiments A0.1-A0.25, wherein:

the channel comprises two or more substantially linear members or linear members and a transition member joining two substantially linear members or linear members; and the substantially linear members or linear members are parallel or substantially parallel to one another.

A0.27. The device of any one of embodiments A0.1-A0.26, wherein the first chamber and the second chamber each independently are a triangular prism or a triangular prismoid.

A0.28. The device of embodiment A0.27, wherein:

the first chamber and the second chamber have a triangular lateral cross section;

the triangular cross section is a right triangular cross section containing a hypotenuse; and the hypotenuse of the right triangular cross section of the first chamber opposes and is parallel to or substantially parallel to the hypotenuse of the right triangular cross section of the second chamber.

A1. A fluid dispenser volume calibration device, comprising:

a substrate comprising an anterior surface, a posterior surface and a side surface;

a first chamber disposed in the substrate, the first chamber comprising an anterior opening disposed at the anterior surface of the substrate and a posterior terminus;

a second chamber disposed in the substrate, the second chamber comprising a posterior opening disposed at the posterior surface of the substrate and an anterior terminus;

a hydrophobic membrane disposed at the posterior surface of the substrate at the opening of the second chamber; and a channel disposed in the substrate, the channel comprising a proximal terminus in fluid connection with the first chamber and a distal terminus in fluid connection with the second chamber.

A1.1. The device of embodiment A1, wherein the channel is wound in a continuous and gradually widening curve from the proximal terminus to the distal terminus.

A2. The device of embodiment A1.1, wherein the channel is wound around a virtual central point on a virtual flat plane coinciding with a surface of the channel.

A3. The device of embodiment A2, wherein the channel comprises an anterior surface and the channel is wound around a virtual central point on a virtual flat plane coinciding with the anterior surface of the channel.

A4. The device of any one of embodiments A1-A3, comprising at least one calibration unit.

A5. The device of embodiment A4, wherein each calibration unit comprises the first chamber, the second chamber and the channel.

A6. The device of embodiment A5, wherein each calibration unit comprises the hydrophobic membrane.

A7. The device of any one of embodiments A4-A6, comprising two or more units arranged in an array.

A8. The device of any one of embodiments A1-A7, wherein the channel comprises an interior surface and at a least portion of the interior surface of the channel is hydrophobic.

A9. The device of embodiment A8, wherein at least a portion of the interior surface of the channel comprises a coating comprising a hydrophobic material.

A10. The device of any one of embodiments A1-A9, wherein:

the channel comprises a major length and a cross section perpendicular to the major length, and the cross section geometry and the cross section surface area of the channel each is substantially uniform across the length of the channel.

A11. The device of embodiment A10, wherein the cross section geometry is a quadrilateral.

A12. The device of any one of embodiments A1-A11, wherein the first chamber comprises a frustrum geometry.

A13. The device of embodiment A12, wherein the frustrum comprises a side that tapers from the anterior opening to the posterior terminus of the first chamber.

A14. The device of any one of embodiments A1-A13, wherein the second chamber comprises a frustrum geometry.

A15. The device of embodiment A14, wherein the frustrum comprises a side that flares from the posterior opening to the anterior terminus of the second chamber.

A16. The device of any one of embodiments A1-A15, wherein the hydrophobic membrane is a disk.

A17. The device of any one of embodiments A1-A16, wherein the hydrophobic membrane comprises a periphery that is bonded to the anterior surface of the substrate.

A18. The device of any one of embodiments A1-A17, wherein the second chamber comprises a side, and the distal terminus of the channel is disposed at the side and the anterior terminus of the second chamber.

A19. The device of any one of embodiments A1-A18, wherein the substrate comprises a well, the well comprises a side, and the proximal terminus of the channel is disposed at the side of the well.

A20. The device of embodiment A19, wherein the well comprises an anterior opening, the anterior opening of the well is disposed in a posterior position relative to the posterior terminus of the first chamber, and the anterior opening of the well is concentrically aligned with the posterior terminus of the first chamber.

A21. The device of any one of embodiments A1-A20, wherein the substrate comprises an anterior section and a posterior section fused to the anterior section.

A22. The device of embodiment A21, wherein the anterior section comprises the first chamber.

A23. The device of embodiment A21 or A22, wherein the posterior section comprises the second chamber and the hydrophobic membrane.

A24. The device of any one of embodiments A21-A23, wherein:

the channel comprises an anterior surface, a posterior surface and a side;

the posterior surface and the side of the channel are disposed in the posterior section; and the anterior surface of the channel is defined by a posterior surface of the anterior section fused to the posterior section.

A25. The device of any one of embodiments A21-A24, wherein the well is disposed in the posterior section.

B0.1. A method for manufacturing a device of any one of embodiments A0.1-A0.28, comprising preparing a substrate by an injection molding process, embossing process and/or die cutting process.

B0.2. A method for manufacturing a device of any one of embodiments A0.1-A0.28, comprising preparing an anterior member and posterior member by a punch process.

B0.3. A method for manufacturing a device of any one of embodiments A0.1-A0.28, comprising:

providing a substrate, an anterior member and a posterior member; and bonding the posterior member anterior surface to at least a portion of the substrate posterior surface and bonding the anterior member posterior surface to at least a portion of the substrate anterior surface.

B0.4. The method of embodiment B0.3, wherein the bonding comprises solvent bonding, laser bonding, adhesive bonding, ultrasonic welding and/or plasma bonding.

B1. A method for manufacturing a device of any one of embodiments A1-A25, comprising preparing a posterior section of any one of embodiments A21-A25 by an injection molding process, embossing process and/or die cutting process.

B2. A method for manufacturing a device of any one of embodiments A1-A25, comprising preparing an anterior section of any one of embodiments A21-A25 by an injection molding process, embossing process and/or die cutting process.

B3. A method for manufacturing a device of any one of embodiments A1-A25, comprising:

providing a posterior section and an anterior section of any one of embodiments A21-A25; and bonding the posterior section to the anterior section.

B4. The method of embodiment B3, wherein the bonding comprises solvent bonding, laser bonding, adhesive bonding, ultrasonic welding and/or plasma bonding.

C1. A method for determining a volume of fluid dispensed by a fluid dispenser device, comprising:

dispensing fluid from a fluid dispensing device into a first chamber of a volume calibration device containing no fluid, whereby the first chamber of the calibration device comprises a dispensed fluid from the fluid dispenser device; wherein:

the dispensed fluid flows from the first chamber into a channel comprising a proximal terminus in association with the first chamber;

the dispensed fluid flows in the channel into a second chamber in association with a distal terminus of the channel;

the dispensed fluid flows in the channel under a pressure differential between the first chamber and the second chamber; and the dispensed fluid fills the second chamber and fills a portion of the channel to a proximal fluid endpoint between the channel proximal terminus and the channel distal terminus in a continuous fluid path between the second chamber and the proximal fluid endpoint;

determining the location of the proximal fluid endpoint in the channel; and determining the volume of the dispensed fluid in the calibration device based on the location of the proximal fluid endpoint.

C2. The method of embodiment C1, comprising applying a vacuum to the volume calibration device.

C3. The method of embodiment C1 or C2, wherein:

the fluid dispensing device is a multichannel dispensing device comprising a plurality of dispenser units;

the calibration device comprises an array of calibration units; and each of the calibration units in the calibration device receives a dispensed fluid volume from one of the dispenser units.

C4. The method of any one of embodiments C1-C3, wherein the volume calibration device comprises a hydrophobic membrane in association with the second chamber, and a distal fluid endpoint of the dispensed fluid is disposed at the hydrophobic membrane.

C5. The method of any one of embodiments C1-C4, wherein the volume calibration device is a device of any one of embodiments A1-A25.

C6. The method of any one of embodiments C1-05, wherein the volume calibration device is a device of any one of embodiments A0.1-A0.28.

The entirety of each patent, patent application, publication and document referenced herein is incorporated by reference. Citation of patents, patent applications, publications and documents is not an admission that any of the foregoing is pertinent prior art, nor does it constitute any admission as to the contents or date of these publications or documents. Their citation is not an indication of a search for relevant disclosures. All statements regarding the date(s) or contents of the documents is based on available information and is not an admission as to their accuracy or correctness.

The technology has been described with reference to specific implementations. The terms and expressions that have been utilized herein to describe the technology are descriptive and not necessarily limiting. Certain modifications made to the disclosed implementations can be considered within the scope of the technology. Certain aspects of the disclosed implementations suitably may be practiced in the presence or absence of certain elements not specifically disclosed herein.

Each of the terms "comprising," "consisting essentially of," and "consisting of" may be replaced with either of the other two terms. The term "a" or "an" can refer to one of or a plurality of the elements it modifies (for example, "a reagent" can mean one or more reagents) unless it is contextually clear either one of the elements or more than one of the elements is described. The term "about" as used herein refers to a value within 10% of the underlying parameter (i.e., plus or minus 10%; for example, a weight of "about 100 grams" can include a weight between 90 grams and 110 grams). Use of the term "about" at the beginning of a listing of values modifies each of the values (for example, "about 1, 2 and 3" refers to "about 1, about 2 and about 3"). When a listing of values is described the listing includes all intermediate values and all fractional values thereof (for example, the listing of values "80%, 85% or 90%" includes the intermediate value 86% and the fractional value 86.4%). When a listing of values is followed by the term "or more," the term "or more" applies to each of the values listed (for example, the listing of "80%, 90%, 95%, or more" or "80%, 90%, 95% or more" or "80%, 90%, or 95% or more" refers to "80% or more, 90% or more, or 95% or more"). When a listing of values is described, the listing includes all ranges between any two of the values listed (for example, the listing of "80%, 90% or 95%" includes ranges of "80% to 90%," "80% 10 to 95%" and "90% to 95%").

Exemplary implementations of the technology are set forth in the claim(s) that follow(s). A number of embodiments of the invention have been described. Nevertheless, it can be understood that various modifications may be made without departing from the spirit and scope of the invention. Accordingly, other embodiments are within the scope of the following claims.

What is claimed is:

1. A fluid dispenser volume calibration device, comprising:

an anterior surface, a posterior surface, a side surface, a first chamber including a first chamber bore, a second chamber including a second chamber bore, a hydrophobic membrane, a channel, a substrate, an anterior member and a posterior member, wherein:

the substrate comprises an anterior surface, a posterior surface, the first chamber bore, and the second chamber bore;

the anterior member comprises an anterior surface and a posterior surface, and the anterior member posterior surface is bonded to at least a portion of the substrate anterior surface;

the posterior member comprises an anterior surface and a posterior surface, and the posterior member anterior surface is bonded to at least a portion of the substrate posterior surface;

the channel disposed at the substrate posterior surface and posterior member anterior surface; a recess disposed at the substrate anterior surface;

the first chamber comprises an anterior opening disposed at the anterior surface of the device and a posterior terminus;

the second chamber opposes the first chamber and comprises a posterior terminus, a sidewall and an anterior terminus;

the hydrophobic membrane is in fluid connection with the second chamber anterior terminus;

the channel comprises a proximal terminus in fluid connection with the first chamber posterior terminus and a distal terminus in fluid connection with the second chamber posterior terminus;

the hydrophobic membrane is disposed in the recess at the substrate anterior surface; and the anterior member comprises a solid portion covering the recess in the substrate anterior surface and the hydrophobic membrane disposed in the recess.

2. The device of claim 1, wherein the second chamber comprises an anterior port disposed at the second chamber anterior terminus and a posterior port disposed at the second chamber posterior terminus and the second chamber sidewall, wherein the channel distal terminus is disposed at the second chamber posterior port.

3. The device of claim 1, comprising a well, wherein:

the well comprises a well anterior terminus, a well sidewall and a well posterior terminus;

the first chamber comprises a posterior port disposed at the first chamber posterior terminus;

the well anterior terminus is disposed at the first chamber posterior port;

a well posterior port is disposed at the well posterior terminus and the well sidewall; and the channel proximal terminus is disposed at the well posterior port.

4. The device of claim 3, wherein:

the posterior member comprises a solid portion disposed at the well posterior terminus; and the anterior surface of the posterior member at the solid portion disposed at the well posterior terminus is a well floor.

5. The device of claim 2, wherein:

the recess at the substrate anterior surface comprises a recessed surface and a recess sidewall; and the recessed surface comprises a recessed surface port.

6. The device of claim 5, comprising a vent, wherein:

the vent comprises a vent anterior terminus, a vent sidewall and vent posterior terminus;

the vent posterior terminus is disposed at the second chamber anterior port; and the vent anterior terminus is disposed at the recessed surface port.

7. The device of claim 5, comprising a lateral duct and an axial duct, wherein:

the lateral duct comprises a lateral duct proximal terminus, a lateral duct distal terminus and a lateral duct sidewall;

the recess sidewall comprises a recess sidewall port and the lateral duct proximal terminus is disposed at the recess sidewall port;

the axial duct comprises an axial duct anterior terminus, an axial duct posterior terminus, an axial duct sidewall, and an axial duct anterior port disposed in the axial duct sidewall at the axial duct anterior terminus; and the axial duct posterior terminus is disposed at the substrate posterior surface.

8. The device of claim 7, wherein:

the anterior member comprises a solid portion covering the lateral duct and the posterior surface of the anterior member at the solid portion covering the lateral duct is a lateral duct ceiling surface; and the anterior member comprises a solid portion covering the axial duct anterior terminus and the posterior surface of the anterior member at the solid portion covering the axial duct anterior terminus is an axial duct ceiling surface.

9. The device of claim 1, wherein:

the anterior member comprises an anterior member bore;

the substrate comprises a first chamber anterior bore comprising a bore anterior opening disposed at the substrate anterior surface; and the anterior member bore is aligned and coextensive with the first chamber anterior bore in the substrate and is a first chamber anterior opening of the device.

10. The device of claim 7, wherein:

the posterior member comprises a posterior member bore; and the posterior member bore is coaxially and/or concentrically disposed at the axial duct posterior terminus.

11. The device of claim 7, comprising two or more calibration units, wherein each calibration unit comprises the first chamber, the second chamber, the channel, the hydrophobic membrane and the recess at the substrate anterior surface.

12. The device of claim 11, wherein each calibration unit comprises a lateral duct and an axial duct wherein:

the lateral duct comprises a lateral duct proximal terminus, a lateral duct distal terminus and a lateral duct sidewall;

the recess sidewall comprises a recess sidewall port and the lateral duct proximal terminus is disposed at the recess sidewall port;

the axial duct comprises an axial duct anterior terminus, an axial duct posterior terminus, an axial duct sidewall, and an axial duct anterior port disposed in the axial duct sidewall at the axial duct anterior terminus; and the axial duct posterior terminus is disposed at the substrate posterior surface.

13. The device of claim 1, wherein the channel comprises an interior surface and at least a portion of the interior surface of the channel is hydrophobic.

14. The device of claim 1, wherein:

the channel comprises two or more substantially linear members or linear members and a transition member joining two of the substantially linear members or linear members; and the substantially linear members or linear members are parallel or substantially parallel to one another.

15. The device of claim 1, wherein the first chamber and the second chamber each independently are a triangular prism or a triangular prismoid.

16. The device of claim 15, wherein:

the first chamber and the second chamber have a triangular lateral cross section;

the triangular lateral cross section is a right triangular cross section containing a hypotenuse; and the hypotenuse of the right triangular cross section of the first chamber opposes and is parallel to or substantially parallel to the hypotenuse of the right triangular cross section of the second chamber.

17. A method for manufacturing the device of claim 1 comprising:

providing the substrate, the anterior member and the posterior member; and bonding the posterior member anterior surface to at least a portion of the substrate posterior surface and bonding the anterior member posterior surface to at least a portion of the substrate anterior surface.

18. The device of claim 1, wherein:

the posterior member comprises a solid portion disposed at the channel and the anterior surface of the posterior member at the solid portion disposed at the channel is a channel floor; and the posterior member comprises a solid portion disposed at the second chamber posterior terminus and the anterior surface of the posterior member at the solid portion disposed at the second chamber posterior terminus is a second chamber floor.

* * * * *